(12) United States Patent
Hallenbeck

(10) Patent No.: US 8,941,677 B1
(45) Date of Patent: Jan. 27, 2015

(54) QUALITY DISPLAY

(71) Applicant: Peter D. Hallenbeck, Efland, NC (US)

(72) Inventor: Peter D. Hallenbeck, Efland, NC (US)

(\*) Notice: Subject to any disclaimer, the term of this patent is extended or adjusted under 35 U.S.C. 154(b) by 202 days.

(21) Appl. No.: 13/724,420

(22) Filed: Dec. 21, 2012

Related U.S. Application Data

(60) Provisional application No. 61/580,353, filed on Dec. 27, 2011, provisional application No. 61/623,109, filed on Apr. 12, 2012.

(51) Int. Cl.
| | | |
|---|---|---|
| *G09G 5/00* | (2006.01) | |
| *G09G 3/20* | (2006.01) | |
| *G06F 15/16* | (2006.01) | |
| *G06F 15/80* | (2006.01) | |
| *G06K 9/00* | (2006.01) | |
| *G06K 9/54* | (2006.01) | |

(Continued)

(52) U.S. Cl.
CPC ..................................... *G06T 11/00* (2013.01)
USPC ........... 345/581; 345/619; 345/629; 345/502; 345/505; 345/55; 382/113; 382/304; 382/305; 701/24; 701/430; 701/455; 709/203; 715/712; 715/763

(58) Field of Classification Search
USPC ......... 345/581, 619, 629–630, 440, 501–502, 345/505, 520, 522, 538, 560, 548, 55, 59; 382/100, 113, 173, 286, 303, 304, 305, 382/307; 701/23–24, 25, 409, 412, 418, 701/422, 430, 451, 454, 455, 461, 517, 701/523; 709/201, 203; 715/700, 708–712, 715/740, 744, 763, 764
See application file for complete search history.

(56) References Cited

U.S. PATENT DOCUMENTS

| | | |
|---|---|---|
| 5,758,313 A | 5/1998 | Shah et al. |
| 5,945,919 A | 8/1999 | Trask |
| 5,960,337 A | 9/1999 | Brewster et al. |

(Continued)

FOREIGN PATENT DOCUMENTS

| | | |
|---|---|---|
| WO | 9503598 A1 | 2/1995 |
| WO | 9854682 A1 | 12/1998 |
| WO | 0010027 A1 | 2/2000 |

OTHER PUBLICATIONS

U.S. Department of Homeland Security, National Incident Management System, Dec. 2008.

(Continued)

*Primary Examiner* — Wesner Sajous
(74) *Attorney, Agent, or Firm* — Steven B. Phillips; Esther F. Queen; Moore & Van Allen PLLC

(57) ABSTRACT

A quality display is disclosed. Embodiments of the invention provide for the display of an indication of quality of a geographic survey. In some example embodiments, a survey grid corresponding to the geographic boundaries of a dynamically created survey area is displayed, where the displayed survey grid expands based on the geographic movement of survey participants. In additional embodiments, data representing the survey grid, cells of the survey grid, and a plurality of sub-cells into which each cell of the survey grid is divided is stored. In other embodiments, a numerical index corresponding to the quality of the survey in each cell of the survey grid is determined based on positioning information. In still other embodiments, a display attribute associated with each cell of the survey grid is adjusted in accordance with the numerical index.

25 Claims, 14 Drawing Sheets

(51) Int. Cl.
*G01C 22/00* (2006.01)
*G06T 11/00* (2006.01)

(56) References Cited

U.S. PATENT DOCUMENTS

| | | | |
|---|---|---|---|
| 6,292,687 B1 | 9/2001 | Lowell et al. | |
| 6,466,258 B1 | 10/2002 | Mogenis et al. | |
| 6,477,387 B1 | 11/2002 | Jackson et al. | |
| 6,642,844 B2 | 11/2003 | Montague | |
| 6,882,307 B1 | 4/2005 | Gifford | |
| 6,985,771 B2 | 1/2006 | Fischell et al. | |
| 7,091,852 B2 | 8/2006 | Mason et al. | |
| 7,245,216 B2 | 7/2007 | Burkley et al. | |
| 7,263,379 B1 | 8/2007 | Parkulo et al. | |
| 7,499,713 B2 | 3/2009 | Gasbarro et al. | |
| 7,518,505 B2 | 4/2009 | Smith | |
| 7,801,842 B2 * | 9/2010 | Dalton | 706/58 |
| 7,937,068 B2 | 5/2011 | Hogberg et al. | |
| 8,290,204 B2 * | 10/2012 | Nielsen et al. | 382/100 |
| 2002/0053978 A1 | 5/2002 | Peterson et al. | |
| 2002/0084900 A1 | 7/2002 | Peterson et al. | |
| 2002/0143469 A1 | 10/2002 | Alexander et al. | |
| 2003/0064704 A1 | 4/2003 | Purpura | |
| 2003/0212494 A1 | 11/2003 | Alexander et al. | |
| 2004/0103431 A1 | 5/2004 | Davenport et al. | |
| 2004/0189464 A1 | 9/2004 | Gill | |
| 2005/0001720 A1 | 1/2005 | Mason et al. | |
| 2005/0024204 A1 | 2/2005 | Germaine et al. | |
| 2005/0038696 A1 | 2/2005 | Kalevik et al. | |
| 2005/0055308 A1 | 3/2005 | Meyer et al. | |
| 2006/0100901 A1 | 5/2006 | Glimp et al. | |
| 2006/0158329 A1 | 7/2006 | Burkley et al. | |
| 2006/0184371 A1 | 8/2006 | Tsalakopoulos | |
| 2006/0211404 A1 | 9/2006 | Cromp et al. | |
| 2007/0035403 A1 | 2/2007 | Krishna et al. | |
| 2007/0050143 A1 * | 3/2007 | Jones | 702/5 |
| 2007/0083409 A1 | 4/2007 | Dilbeck et al. | |
| 2007/0087726 A1 | 4/2007 | McGary et al. | |
| 2007/0103292 A1 | 5/2007 | Burkley et al. | |
| 2007/0103294 A1 | 5/2007 | Bonecutter et al. | |
| 2007/0103461 A1 * | 5/2007 | Suzuno et al. | 345/419 |
| 2007/0126573 A1 | 6/2007 | Valania | |
| 2008/0052142 A1 | 2/2008 | Bailey et al. | |
| 2008/0133300 A1 | 6/2008 | Jalinous | |
| 2008/0221965 A1 | 9/2008 | Riddle | |
| 2009/0045942 A1 | 2/2009 | Schurter | |
| 2009/0063191 A1 | 3/2009 | Vasquez et al. | |
| 2009/0063234 A1 | 3/2009 | Refsland et al. | |
| 2009/0284348 A1 | 11/2009 | Pfeffer | |
| 2010/0158202 A1 | 6/2010 | Johnson et al. | |
| 2010/0321244 A1 | 12/2010 | Kelly | |
| 2011/0043373 A1 | 2/2011 | Best et al. | |
| 2011/0071880 A1 | 3/2011 | Spector | |
| 2012/0130632 A1 | 5/2012 | Bandyopadhyay et al. | |

OTHER PUBLICATIONS

PRWEB, Zco to Introduce FireTab App at Upcoming Firefighter Training Conference, Apr. 18, 2012, http://www.prweb.com/releases/2012/4/prweb9414829.htm.

Reading Eagle, Virginville firefighters create a way of alerting fellow emergency personnel, Jun. 6, 2012, http://readingeagle.com/mobile/article.aspx?id=391140.

Fire Engineering, First-Responder Alliance iNc. Releases App for Firefighters, Sep. 12, 2011, http://www.fireengineering.com/articles/2011/09/first-responder-alliance-releases-app.html.

Streetwise, Streetwise Featured at Canadian Technology Summit, Sep. 14, 2012, http://www.streetwisecadlink.com/2012/09/streetwise-featured-at-canadian-technology-summit/.

* cited by examiner

QUALITY DISPLAY

CROSS-REFERENCE TO RELATED APPLICATIONS

This application claims priority from commonly owned provisional patent applications Ser. No. 61/580,353, filed Dec. 27, 2011, and Ser. No. 61/623,109, filed Apr. 12, 2012, the entire disclosure of both of which is hereby incorporated herein by reference.

BACKGROUND

Wireless communication systems have been commonly employed for some time to provide voice and data communications to subscribers within prescribed geographic areas. A typical modern wireless digital communication system includes one or more wireless mobile devices that communicate with a plurality of base stations. Each wireless mobile device may be hand-held or attached to a vehicle and may take any of various forms, including a tablet, phone or wireless digital assistant. Some of these devices have both voice and data capability while others provide data communication functions only.

At one time, determining the location of a device within a mobile communication system presented a challenge. However, most modern digital mobile devices are capable of using the global positioning system (GPS) for determining the device's location. GPS is a space based triangulation system using satellites and computers to measure positions anywhere on earth. Because of the capability of these devices to access the World Wide Web, and the capability of these devices to run application software programs ("apps") that can make use of locally determined GPS information, real-time geographic information can be displayed to users of the devices in useful ways. Map data may also be acquired in real time over the public wireless data network or stored in a device. In either case, the geographic information can include the position of the device in question relative to map features.

SUMMARY

Provided herein are embodiments directed to methods of displaying an indication of quality of a geographic survey. In some embodiments, the method includes displaying a survey grid corresponding to the geographic boundaries of a dynamically created survey area, wherein the displayed survey grid expands based on the geographic movement of survey participants. In some embodiments, the method includes storing data representing the survey grid, cells of the survey grid, and a plurality of sub-cells into which each cell of the survey grid is divided. In some embodiments, the method includes determining, using a processor and ongoing positioning information for each participant engaged in the survey relative to each sub-cell within the cells, a numerical index corresponding to the quality of the survey in each cell of the survey grid. In some embodiments, the method includes adjusting, using a processor, a display attribute associated with each cell of the survey grid in accordance with the numerical index.

In some embodiments of the method, the numerical index is based on the number of times any participant has entered a cell of the survey grid or each sub-cell within a cell. In other embodiments, the participant is not counted as having entered a cell until the participant is a pre-selected distance inside the perimeter of the cell. In still other embodiments, the numerical index is based on the number of times any unique participant has entered a cell or each sub-cell within a cell. In further embodiments, the numerical index is based on the number of sub-cells within a cell that have been occupied by at least one participant.

In further embodiments of the method, the display attribute is the opacity of a cell as seen overlain on a digitally displayed map of the designated survey area. In some embodiments, the adjusting, using a processor, a display attribute associated with each cell includes adjusting, using a processor, the opacity of a cell based on the percent of sub-cells within the cell that have been occupied by at least one participant. In other embodiments, the dynamically created survey area is restricted to pre-set overall fixed geographic area.

In some embodiments, the ongoing GPS positioning information comprises a latitude and a longitude. In other embodiments, each cell has a square shape. In still other embodiments, the method further includes determining, using a processor, that at least one participant is positioned a preselected distance outside of any of the cells. In some embodiments, the method includes creating, using a processor, a new cell in response to determining the position of the at least one participant.

The embodiments further provide for computer program products that include a non-transitory computer readable medium having computer program code embodied therein, the computer program code being configured to display an indication of quality of a geographic survey. In some embodiments, the computer program code includes instructions for displaying a survey grid corresponding to the geographic boundaries of a dynamically created survey area, wherein the displayed survey grid expands based on the geographic movement of survey participants. In some embodiments, the computer program code includes instructions for storing data representing the survey grid, cells of the survey grid, and a plurality of sub-cells into which each cell of the survey grid is divided. In some embodiments, the computer program code includes instructions for determining using ongoing positioning information for each participant engaged in the survey relative to each sub-cell within the cells, a numerical index corresponding to the quality of the survey in each cell of the survey grid. In some embodiments, the computer program code includes instructions for adjusting a display attribute associated with each cell of the survey grid in accordance with the numerical index.

In some embodiments of the computer program product, the numerical index is based on the number of times any participant has entered a cell of the survey grid or each sub-cell within a cell. In other embodiments, the participant is not counted as having entered a cell until the participant is a pre-selected distance inside the outer perimeter of the cell. In still other embodiments, the display attribute is the opacity of a cell as seen overlain on a digitally displayed map of the designated survey area.

In further embodiments of the computer program product, the numerical index is based on the number of sub-cells within a cell that have been occupied by at least one participant. In other embodiments, the numerical index is based on the number of times any unique participant has entered a cell or each sub-cell within a cell.

In additional embodiments, systems for displaying an indication of quality of a geographic survey are provided. In some embodiments, the system includes a data store comprising data representing the survey grid, cells of the survey grid, and a plurality of sub-cells into which each cell of the survey grid is divided. In some embodiments, the system includes an instruction execution platform including non-transitory computer program code, which when executed, causes the instruction execution platform to: display a survey grid corresponding to the geographic boundaries of a dynamically created survey area, wherein the displayed survey grid expands based on the geographic movement of survey participants. In some embodiments, the instruction execution platform determines, using ongoing positioning information for each participant engaged in the survey relative to each sub-cell within the cells, a numerical index corresponding to the quality of the survey in each cell of the survey grid. In some embodiments, the instruction execution platform adjusts a display attribute associated with each cell of the survey grid in accordance with the numerical index.

In some embodiments of the system, the numerical index is based on the number of times any participant has entered a cell of the survey grid or each sub-cell within a cell. In other embodiments, the numerical index is based on the number of sub-cells within a cell that have been occupied by at least one participant. In still other embodiments, the display attribute is the opacity of a cell as seen overlain on a digitally displayed map of the designated survey area.

In other embodiments, apparatuses for displaying an indication of quality of a geographic survey are provided. In some embodiments, the apparatus includes means for displaying a survey grid corresponding to the geographic boundaries of a dynamically created survey area, wherein the displayed survey grid expands based on the geographic movement of survey participants. In some embodiments, the apparatus includes means for storing data representing the survey grid, cells of the survey grid, and a plurality of sub-cells into which each cell of the survey grid is divided. In some embodiments, the apparatus includes means for determining, using ongoing positioning information for each participant engaged in the survey relative to each sub-cell within the cells, a numerical index corresponding to the quality of the survey in each cell of the survey grid. In some embodiments, the apparatus includes means for adjusting, using a processor, a display attribute associated with each cell of the survey grid in accordance with the numerical index.

In some embodiments of the apparatus, the numerical index is based on the number of times any participant has entered a cell of the survey grid or each sub-cell within a cell and/or the number of sub-cells within a cell that have been occupied by at least one participant. In further embodiments, the display attribute is the opacity of a cell as seen overlain on a digitally displayed map of the designated survey area.

DETAILED DESCRIPTION OF EXAMPLE EMBODIMENTS

Figure 1:
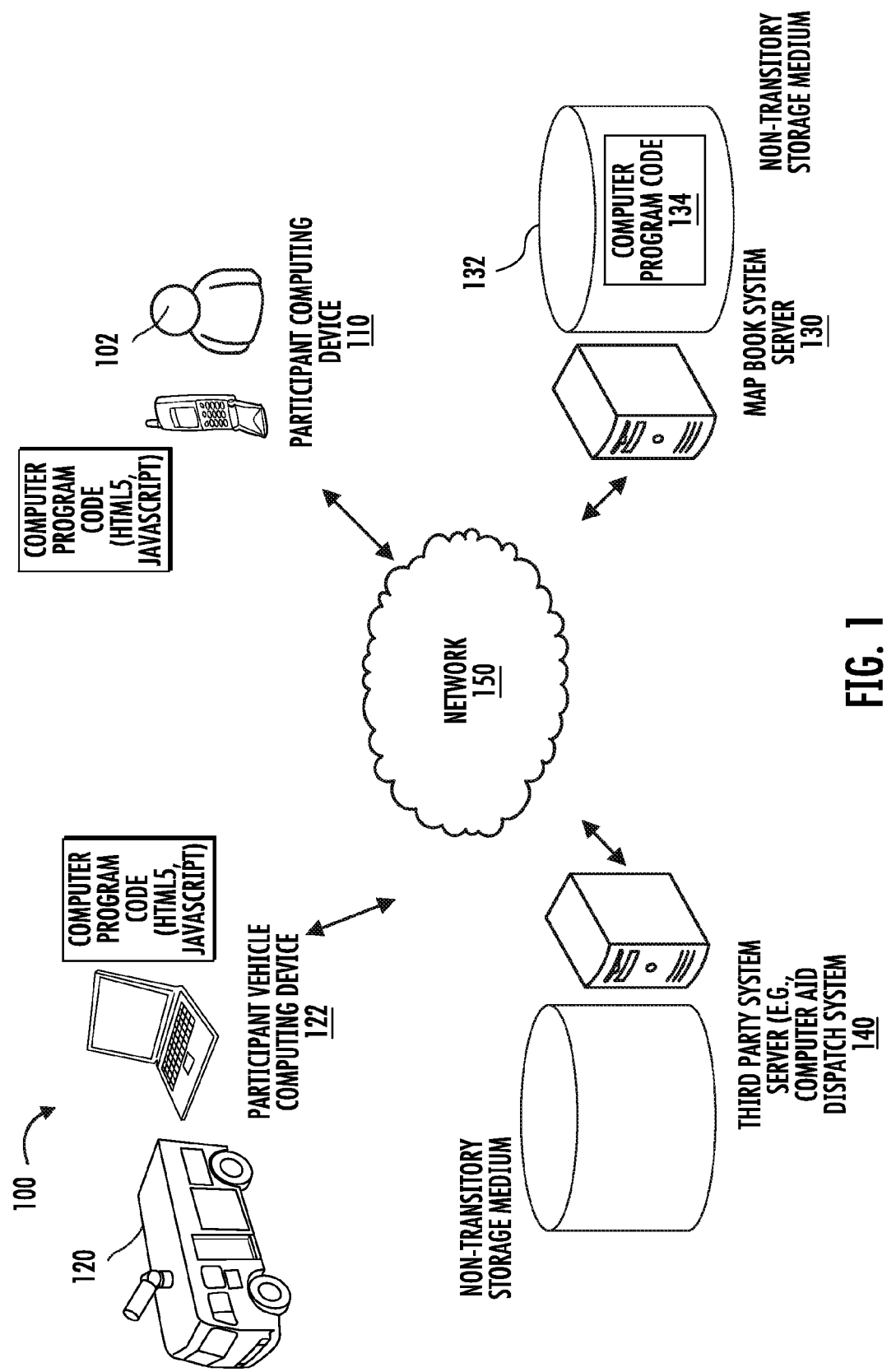
FIG. 1 illustrates a system and environment for managing map displays in accordance with various embodiments.

The following detailed description teaches specific example embodiments of the invention. Other embodiments do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. Unless otherwise expressly stated, comparative, quantitative terms such as "less" and "greater", are intended to encompass the concept of equality. As an example, "less" can mean not only "less" in the strictest mathematical sense, but also, "less than or equal to."

As will be appreciated by one of skill in the art, the present invention may be embodied as a method, device, article, system, computer program product, or a combination of the foregoing. Any suitable computer usable or computer readable medium may be utilized for a computer program product including non-transitory computer program code to implement all or part of an embodiment of the invention. The computer usable or computer readable medium may be, for example but not limited to, a tangible electronic, magnetic, optical, electromagnetic, or semiconductor system, apparatus or device. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disc read-only memory (CD-ROM), or an optical storage device. The computer usable or computer readable medium may be one or more fixed disk drives or flash drives deployed in instruction execution platforms, such as servers or workstations, forming a "cloud" or network.

Computer program code for carrying out operations of the present invention or for assisting in the carrying out of a method according to an example embodiment of the invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

Computer program instructions may be provided to a processor of an instruction execution platform such as a general purpose computer, special purpose computer, server, workstation or other programmable data processing apparatus to produce a machine, such that the instructions, which execute via the processor of the computer or other programmable data processing apparatus, create means for implementing the functions/acts necessary to carry out an embodiment of the invention.

Embodiments of the invention combine a number of technologies in the arena of electronic maps, electronic mobile platforms and real time tracking Map backgrounds from sources such as Google Maps or from geographic information system software exist for many countries or, in the case of Google Maps, the entire world. Embodiments of the invention can make use of smart phones, tablets and laptops with GPS capability or connectivity. These mobile platforms have Web clients, also called Web browsers that can be used to implement an embodiment of the invention. With JavaScript these platforms can run reasonably complex software presented in the Web browser. These platforms can also display information via a dedicated application or "app" that is based on languages such as objective C or HTML5.

The location of one of these platforms as determined by the integrated GPS receiver can be communicated with a server either through the Web browser or an app. However, embodiments of the invention allow users of these devices in certain situations to go beyond simple plotting of the location of an individual user. Rather some embodiments allow a plurality of devices used by participants in an "event" to work together and maintain situational awareness in a number of ways. A device placed with one of these users can be referred to as a "participant device." Further, if the device is carried on the person of the user, it may be referred to herein as a "participant computing device" and if it is fixed in a vehicle occupied by one of these users is may be referred to herein as a "participant vehicle computing device." In some embodiments, users referred to as "participant responders" who are participating in the event in roles where they have heretofore normally had little control of the way information is disseminated to the group, can exercise control of multiple electronic displays to provide a more versatile system. Such control includes displaying groups of users associated with other events, changing the location of events, and choosing how the participant responder is represented to all other participants. Participant responders, for example an emergency services context, may include firefighters, police officers, or paramedics actually in the field, actively working an incident.

Other embodiments of the invention allow for a participant to have situational awareness when his or her device has lost communication with the network, because the participant has moved into a geographic area with no wireless public data network coverage. Still other embodiments allow for a system to display a geographic coverage area or "grid" and provide an indication of the quality of the coverage of that area to participants, supervisory personnel, or both.

The uses of embodiments of the invention include emergency services, repair fleet and work ticket management and more generically for groups of people involved in an event such as a business meeting, a construction project, television coverage, or a social event such as a group meal, outing, or vacation. Example embodiments of the invention can be used to track the location and status of people ("participants") who are involved in an event. The system allows for better coordination between the participants in the event. The nature of the event may also drive the selection of people who would become involved with the event, and may control which resources are displayed to the participants.

Embodiments of the invention can be illustrated by making use of the concept of an event that can involve individual participants, each making use of one or more mobile devices. A system according to embodiments of the invention can also maintain data representing the status of the mobile device relevant to the event. This model can be applied to social situations as well, such as a family reunion or school field trip. This model can also be applied to a business environment and used by an enterprise with people involved in some event such as a trade show, sales meeting, or a larger scale event such as providing media coverage of a golf tournament. The detailed examples herein that pertain to emergency responders who have been "paged out" to some emergency incident are presented purely as examples.

In some embodiments, in the emergency services context, the data displayed on a participant device can be limited by only displaying a possible route between the participant's current location and the incident/event location if the participant is above some distance threshold from the event location. This aids responders who are going to an incident that is outside of areas where they know the roads by suggesting a possible route to the incident. Another feature in some embodiments is to automatically turn on traffic monitoring information if the call is on an Interstate or in a database where road names that are known to have traffic sensors are stored. The road names in the database would also have fields for the assigned Public Service Answering Point (PSAP) and the assigned department.

In some embodiments, participants can annotate the displayed map with useful information Annotations can have attributes that indicate the meaning of a representative symbol and at what zoom level of the map the responder should be displayed. For example, hydrants near a fire should only be displayed if they are within a certain distance, only if the map is zoomed in sufficiently that the icons for the hydrants would be distinctly visible and only if the event was a fire. This allows groups to pre-plan an area with resources and locations needed and have them displayed on all participant's maps. In essence, the map becomes a "situational awareness display." Events can be initiated by a number of means, and mechanisms could be used that would only notify participants who's skills or interest match the nature of the event.

Embodiments of the invention provide a system that might be referred to as a "smart map book" for participants in an event or incident. In fact, the system may be referred to herein as a "map book system" and the server that carries out the functions of controlling the electronic display of information to participants may be referred to herein as a "map book system server." In example embodiments, participants can use the system to see where people are, what their status is, what the event is, and optionally see other resources that would be relevant. In some embodiments, icons overlaid on the displayed map can that indicate locations of the event, resources and the responders can be tapped on a multi-touch display to reveal additional information or links to other data relevant to the icon such as a building lay-out or information on the responding entity's resources.

In some embodiments, a collection of Web pages running JavaScript or similar software from the map book system server can be used to display a map page suitable for an individual participating in an event, an overview map of all participants, a list of events or work orders that are active, map-based software interface to enable the entry of pre-plan information, and an interface for incident creation and editing. These pages work with a common back end database to provide a Web based digital map book system with advanced features.

Parts or all of an embodiment of the invention can be implemented by computer software in combination with processing hardware. The computer software can be stored in a non-transitory manner on computer-readable media. The software is executable, notwithstanding intermediate compilation or other steps that may be needed, and in operation is executed by one or more processors, which may be embedded, or reside in servers, workstations or any type of networked computer system.

A participant device used with an embodiment of the invention may be a mobile platform. A mobile platform is any device that has a GPS receiver or means to connect to an external GPS receiver, means to access a wireless data network such that it can communicate with at least one computer network server, a display and means for a user to provide input. A touch screen graphics display would combine the display function with the user input capabilities. As some embodiments of the invention do not require user input from all participants, a participant device can also be a mobile tracking unit. A mobile tracking unit may be a simpler device, which has only a GPS receiver and means to access a wireless data network to allow the mobile tracking unit to communicate its position to a network server. Both the mobile platform and the mobile tracking unit have means to uniquely identify themselves to the server and either of these could also serve as a mobile device that is not associated with a person or vehicle, but with some other entity. A number of these mobile devices can work together in a cooperative group through a common server with the full knowledge and cooperation of the people who have these devices under their control. It should be understood that when it is said that an entity, resource or participant is being tracked, in reality a device with capabilities such as those discussed above is associated with that entity, resource, or participant and is being tracked. The entity could be a person, a vehicle, a dog, or anything capable of physically having a mobile device attached, strapped, in a pouch or any other way that allows the mobile device to be in close proximity to entity.

A mobile device that is in a vehicle be that a temporary or permanent arrangement can be used to track the location of that vehicle. An example of a temporary arrangement would be a person on or in a car or other mobile apparatus that has their smart phone with them. An example of a permanent arrangement would be an tablet computer mounted in a vehicle.

The system according to some embodiments of the invention could provide for the members of a cooperative group to have the ability to enumerate which skills or interests they have. When an event is instantiated, the entity that instantiates the event can also provide indications of the skills or interests relevant to the event. The system could then select those members whose skills and interests match the skills and interests relevant to the event and insure that only those members receive messages regarding the event.

The system could also be set up so that all the trackable entities also have associated with them a status. Examples of such status would be states such as "idle", "involved with an event", and "not willing to be involved with any event." Note that additional states such as "going to a location" and "have arrived at a location" could also be valid states. Note also that the states may not be mutually exclusive. A device that is "involved with an event" can also be "going to a location" and as such has two states.

The concept of states can be tied with the concept of an event. As an event is initiated, the users may indicate that they will respond to the event. Others users will be able to track the location of the participants in the event. Originating notification of the event may occur via messaging to the mobile platforms such as by emails or text messages. Origination notification can be via a Web page that displays all active events that the member could be involved with. In some embodiments, by tapping an active event, the participant indicates that they at least wish to follow the event, and then subsequently may optionally be involved with the event. In the some embodiments, this displayed Web page can be called the "park page."

It should be noted that the names given to the states will often be dependent on the use context for an embodiment of the invention. For example, in a social networking context, if the event were a family reunion a participant can "idle" if they have not agreed to be involved with any events that have been initiated by other family members. As each family member receives notification of an event (such as "We're going to a movie at the Starlight Theatre at 1234 Main St."), they can elect to be involved with the event by pressing an icon on their smart phone screen. The family member then becomes a participant and the family member's status may become "involved with an event." At that same time, the family member may also be assigned the status of "going to a location." Once the family member gets to the location of the event, the participant may elect to tap the button, which changes their status from "going to the event" to "have arrived at location." By examining the states, the system can make general determinations such as "the member is not idle." When the movie is over, the family member may change their status back to "idle" by either pressing a button on the screen or by having the event's organizer press a button on their screen to end the event for all participants. It should be noted that the phrase "press a button" can refer to a touch screen device where the user is touching a rendering of a button or text phrase, as is common with many mobile platforms. It should be noted that the names of these states are provided only as examples.

Turning to the specific example of emergency services, the states that firefighters and apparatus such as vehicles might have in an example embodiments of the invention include "available", "assigned", and "out of service." An event might be termed an "incident" and may correspond to a call for service (CFS) received by a Public Service Answering Point (PSAP), more commonly referred to in the United States as the "911 Center." Dispatchers, also called tele-communicators, take information from the public about an emergency and then dispatch resources, such as a fire department. The software system that often facilitates this process is called a computer aided dispatch (CAD) system. This system is typically a centralized system at the PSAP.

FIG. 1 illustrates a system and operating environment according to embodiments of the present invention. The example of FIG. 1 illustrates an embodiment of the invention in the emergency services context. Illustrated as part of or together with system 100 is participant 102 and participant computing device 110. Also illustrated is a vehicle, 120, and a participant vehicle computing device 122. Map book system server 130 serves as an instruction execution platform to carry out many of the functions of this embodiment of the invention. Server 130 includes or is connected to a non-transitory storage medium 132, which includes computer program code 134.

Still referring to FIG. 1, it should be noted that at times, portions of computer program code to implement functions of an embodiment of the invention can reside in participant computing device 110 and/or participant vehicle computing device 122 as shown. This computer program code may take the form of HTML 5 or JavaScript which is downloaded to the participant device during operation. Various third-party system servers, for example, computer aided dispatch system server 140 may also be connected to the system. As can be seen, these third part servers may also include a non-transitory storage medium for storing computer program code. All of the various geographically distributed components of the system are interconnected by network 150. A processor in map book system server 130 and/or those in participant devices 110 and 122 can execute computer program code instructions to carry out embodiments of the invention. In some embodiments, portions of the computer program code can also reside on third party system servers.

When a call is received by the PSAP, the CAD system then sends electronic messaging to the agencies that should respond to the event. Sometimes this is a radio signal to a special receiver. With the advent of text messaging and email, messages are often sent to the phones of various individuals and/or their email accounts in addition to the radio paging. Apparatus or individuals can also have a dedicated phone or tablet device and receive a text message or email. The text messages are often sent in the form of emails in the current cellular systems. The software that is running on the map book server can be on the email list for CAD originated events. In this manner, an embodiment of the invention can receive notification of the incident from the CAD system at the PSAP.

In a typical situation the map book system receives the CAD originated message which will also contain information about the nature of the emergency, such as whether it includes a fire. The message also contains at least one location for the event. The system uses this information (that there is a fire) and uses information about the skills of the various members of the fire department (involving both firefighters and apparatus) and sends messaging to all members of the cooperative system who's skills match the requirements of the call. People who do not have fire skills would not receive messaging about this emergency call. Conversely, if a given firefighter did not have medical skills, that firefighter would not receive messaging regarding a medical call.

Alternatively, the members can have their mobile devices left powered up with the browser open to a Web page that shows all active incidents that the members of the relevant department can respond to. The same or different skills filtering may be used for that user when on this "park page" Web site is displayed. The park page can order active events either by time with, for example, the most recent on top or by distance with, for example, the closest incident on top or used an assigned priority to place the most important call on the top of the displayed incident list. Any other ordering is possible.

It is important to note that this map book system can function independently from the CAD system which originated the event. While the map book system can be designed to communicate directly with the CAD system, it can also function in a standalone capacity. The functionality of the map book system still augments the responder's environment and adds to the functionality of the CAD system. Should the map book system either fail or have communications problems due to its reliance on the public cellular data network, the participants still have the PSAP's private radio system available to them. Also, the state information of embodiments of the invention can be different than that of the CAD system. A Web page in the system can allow users to instantiate a CFS if the PSAP was down.

The map book system may also cooperate with a CAD system and exchange the location and status of the users of the system so that their position and display may be shown to users of the CAD system. The CAD system may also exchange information about other mobile devices that are part of the CAD system but not part of the map book system so that users of the map book system can see other resources outside of the user base of the map book system.

As an example, assume that for an area or department served by a map book system that no firefighters or apparatus are out on any calls. Any recipients to receive messaging are in an idle state, or from a perspective of the Nations Incident Management System (NIMS) are "available." Messaging about an incident will include information that allows the location of the emergency to be shown on a map. This information may be a street address, the latitude and longitude of the incident or a local name such as "The Big Barn." Responders then have a screen with a map as the background canvas and an icon at the location of the emergency incident. This screen can be called the "incident page." There is also a button rendered on the map screen which reads "in route" or similar text such as "I can respond." When the responders, be they individuals or people assigned to apparatus (a vehicle), tap that button, their status changes to "assigned" within the system. These participants are then associated with the event. Responders may optionally also be in a state called "in route," which means a responder is traveling to the incident location. As such, a responder can be in two states at the same time. This condition is not supported by CAD systems and differs from the current NIMS system as of this writing. Once a responder arrives at the location, he or she can tap a button labeled "on scene" to change their state from "in route" to "on scene." Such a responder's "assigned" state has not changed, and the firefighter or vehicle is still in two states.

Some embodiments of the map book system provide for the ability for a responder in the field to move the location of the incident by tapping a button labeled "move incident." To reiterate terminology, all personnel and/or vehicles with devices involved in an event can be termed "participants" herein. In the emergency services context, the term "participant" may include supervisory personnel, administrators and the like. A "responder" is a participant actually participating in the response "on the ground" or "in the field." The term "participant responder" is used herein to refer to a responder who is actually interacting with the system through a device on his or her person or in an apparatus such as a vehicle.

Embodiments of the invention allow a participant responder to move the indicated location of an event in the system, as distinguished from allowing a dispatcher or administrator move the indicated location. This feature allows for situations where the event location was either incorrect or approximate as would be the case for an incident on an interstate where only a mile marker was given out on initial dispatch. When the participant responder taps the "move incident" button, the location of the incident is changed in the server and the new location is supplied to all the mobile platforms connected to the server. The mobile platforms then update the display on each department's incident page to reflect the actual location of the incident for all participants to see. The map book system can be architected so that the incident is automatically moved to the geographic position of the participant responder, or a position that is specified by further input or in some other manner.

Figure 2:
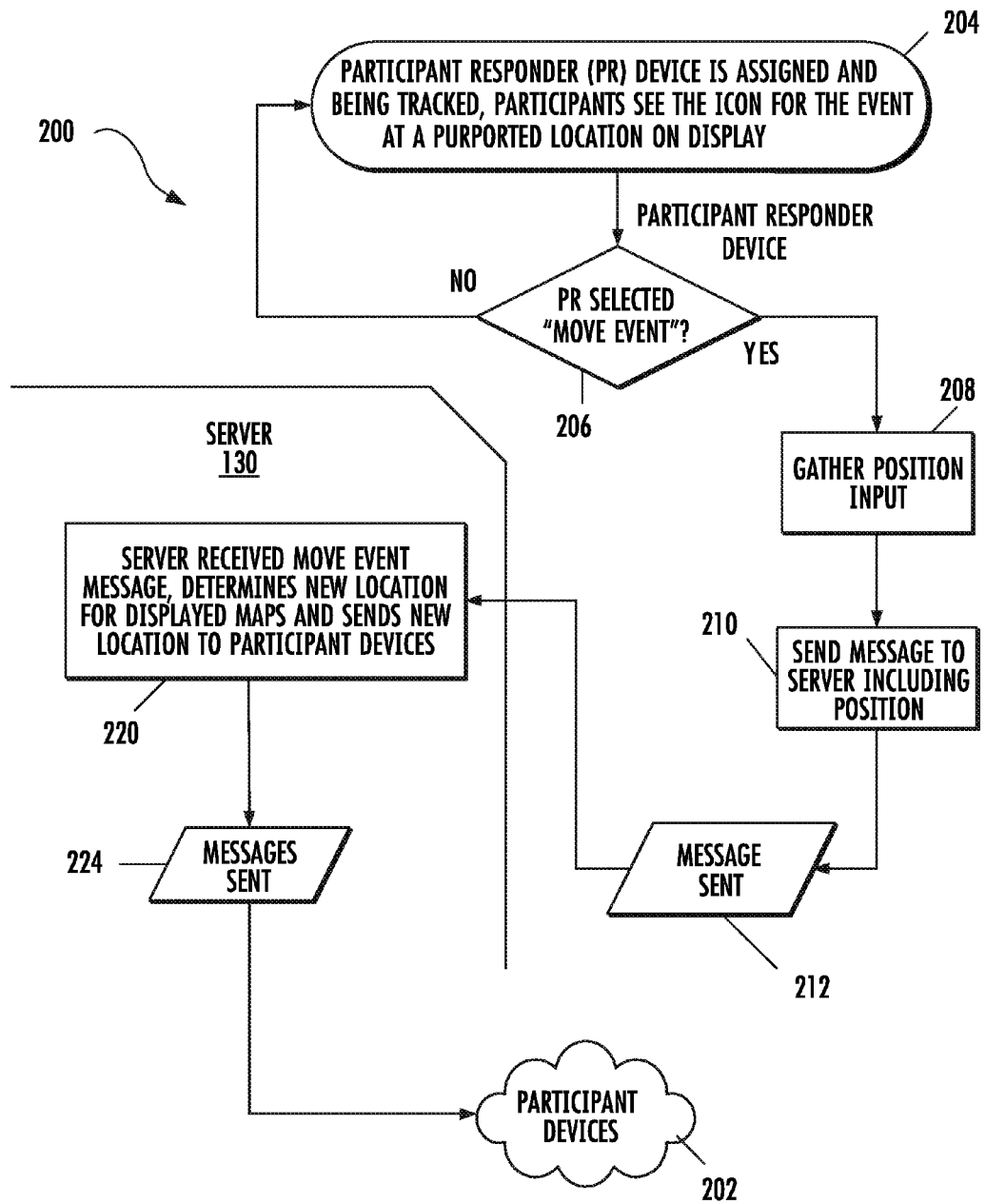
FIG. 2 is a flowchart illustrating the process of moving the displayed location of an event in accordance with various embodiments.

FIG. 2 shows a flowchart illustrating the method of moving an event as described above. Like most flowcharts, FIG. 2 illustrates process 200 as a series of process or sub process blocks. The portion of the flowchart in the lower left, behind the dividing line illustrates subprocesses performed at map book system server 130 of FIG. 1. The other subprocesses illustrated as part of method 200 are performed at the participant responder device. Note that this process moves the displayed location of the event for all participant devices 202. At block 204, the participant responder device is assigned and being tracked and participants see the icon for the event at a purported location on the display. At block 206, the script or other computer program code in the participant responder device is monitoring for the participant responder to press a button to move the event. Nothing changes relative to this feature if the participant responder takes no action at block 206. However, at block 208, when the participant responder provides input indicating that the event is to be moved, position input is gathered. In some embodiments, this position input is simply the current geographic position of the device as reported by the local GPS receiver. At block 210, the device then sends a message as shown at block 212. This message is received at the server as shown at block 220. This "move event message" causes the server to determine a new location for displayed maps and subsequently send the new location to all participant devices at block 224. Participant devices 202 are then updated with the new location information. In effect, the input provided by the participant responder has altered data related to participant display content at the map book server communicating with the participant devices. This in turn causes the map book server to update the electronic display of all participant devices.

To continue describing an example emergency services scenario, when the call has concluded, responders may tap a button called "available" to indicate that they are able to respond to new calls and to change their status in the system to available. Optionally, a button labeled "clear all units" may be pressed to clear all members who are assigned to this event at once. This button (and possibly others) may only be displayed on mobile platforms whose members have a specific skill such as "officer" or "driver". It should be noted that buttons can either be displayed on the screen all the time, or be accessed via a menu system used to navigate and display a number of buttons/actions that the responder can take.

Note also that a button labeled "out of service" might be accessible from a responder's mobile platform's screen. Tapping this button can change the responder from the "assigned" state to and "out of service" state, presumably because of some inability to respond to calls, for example, an equipment malfunction. In the emergency services context, the more generic "not willing to be involved with any event" state may be called the "out of service" state. In some embodiments, this button is on the incident page but may optionally be on the park page or other pages so that an apparatus that is "available" can change be changed to "out of service."

A special case exists in some embodiments of the invention when a participant is "assigned", "in route" or "on scene" of an event and then receives a message for a new event. When the user changes their incident page to pertain to the new event by reading the messaging and then pressing a URL in the message or email, and then presses the "in route" button on the new incident page, the participant's state changes to "available" on the existing call and changes directly to "assigned" and "in route" for the new call. The system changes the status of the participant on the existing call to "available" since the participant can only be "assigned" to one event at a time. This "special case" of a new incident accommodates a common occurrence. In the example of the family reunion, these actions correspond to deciding to not go to the movie when a text message announcing that another group is going to eat is received and the member decides to cancel the movie and instead go to the eating event. This special case means the participant did not have to first change his or her state to "available" on the existing event so that he or she could then go "in route" to the new one.

In some embodiments of the invention, the display of various buttons to a participant can be qualified by the skill set of the participant who is associated with a mobile device. For example, only the Chief or an officer would be able to "clear all units" from a call because only their mobile platform's display would show that button. So a member with "officer" skills would have the button to "clear all units" displayed, whereas users without this skill would have no button displayed or the button would be displayed in a manner where it was clear to the member that it was inactive.

Some embodiments of the invention allow the logging of the status changes of all participants in the event so that this log can be emailed, for example, to a fire department. Paperwork that is done by the fire department may require information on when participants were in route, on the scene, available, and sometimes other key points in the event (such as when water was first put on the fire). Through a mix of logging status changes and buttons allowing for participant initiated logging, the map book system can collect this information for a department and send it all in an email or otherwise save it for when the event is concluded. This function can be performed independently from similar functions performed by the PSAP. Skills may also be used to qualify if the status changes of participants are logged. For example, only officers and apparatus might have status changes or event times logged.

Buttons to help members perform the above-described logging may also only be available when the member is in a certain state, such as "assigned" and/or "on scene." This optional dynamic button rendering helps manage the number of icons and buttons on the small screens typical of a smart phone or tablet devices, and aids the user by presenting only options that are pertinent to the current situation of the event. Logs could be emailed to an email address or to participants with specific skills such as officers. The emailing could be triggered by actions such as clearing all units, or a dedicated button. As another example, a "may-day" function button could exist so that users could advise that they were in trouble. Tapping the button could send out both an incident message and make an entry in the log file.

The above examples illustrate the concepts of events and states, as well as an example flow of information and state changes through a map book system. It should be appreciated that different uses of the system will result in different names. For example, in a business meeting context, "idle" might be "free", "assigned" might be "in a meeting", and "not willing to be involved with any event" might be "do not disturb."

The above examples also illustrate the concept of optionally having list of interests or skills associated with the event, and matching those interests or skills to a matching list, which is maintained for each participant. Both examples illustrate that the instantiation of an event can occur from either a participant or the reception of some outside electronic messaging. In a Web based implementation, a unique ID can be embedded into the URL so that each user can be individually identified and thus tracked. Knowing who the individual is also allows for a custom per user skill selected Web page to be rendered by the system. It is also possible to identify individual users who may wish to access other Web pages by using a cookie that may be left on the participant's platform to perform this function. In this manner, a Web page may choose to only allow access to certain users based on who they are, what skills they have, or what level of service they have subscribed to. This feature can both make the system so that it is not accessible to unauthorized users and control what authorized users can do or see on any given page. It should be understood that various implementations of the system may or may not use these techniques depending on the actual intended use. By way of example, the family vacation version would not need a "water on the fire" button.

Figure 3:
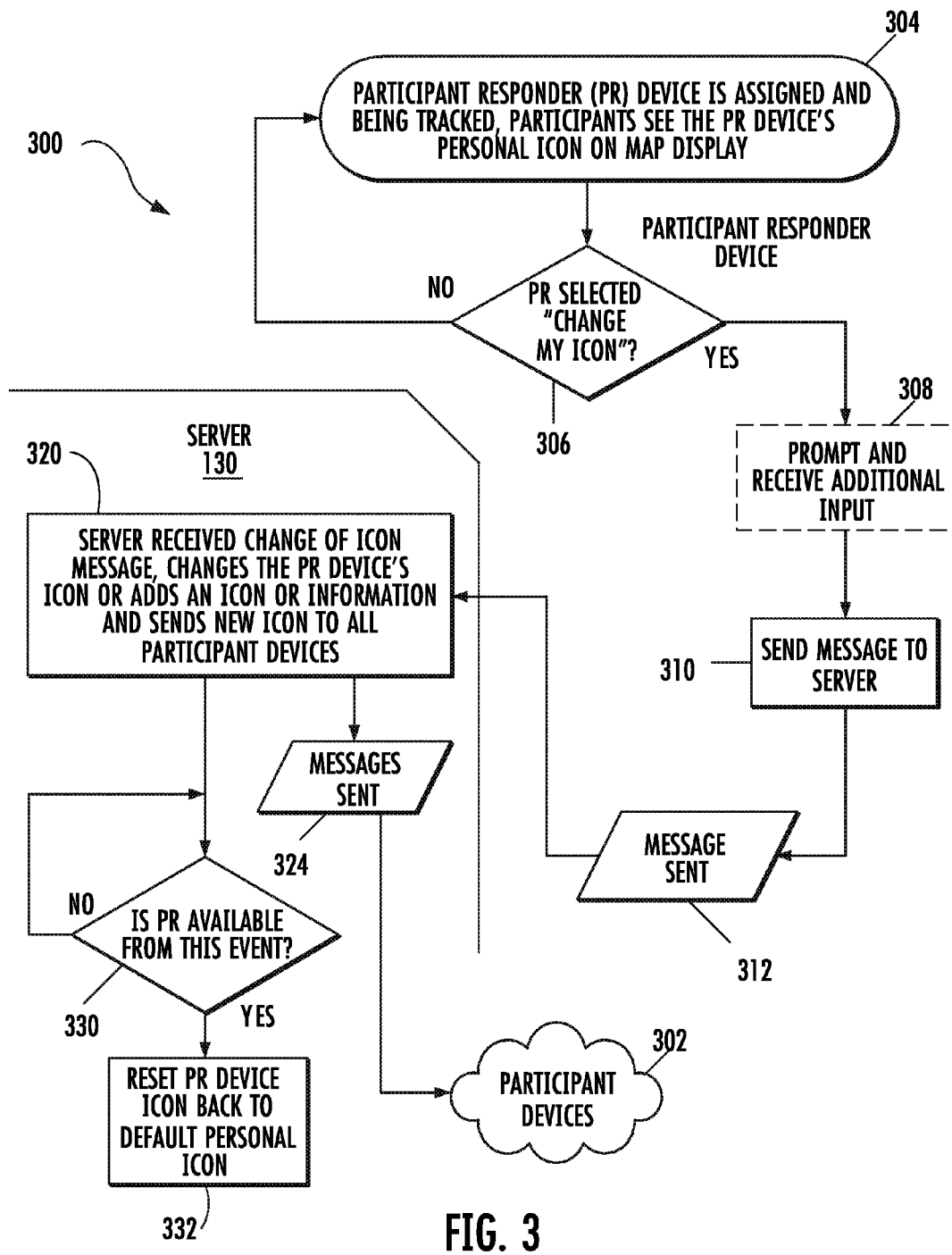
FIG. 3 is a flowchart illustrating the process of a participant responder changing his or her icon in accordance with various embodiments.

In the arena of emergency services, especially when working with volunteer fire departments, it may be desirable to have the ability to dynamically change the association between a participant and a mobile platform. Thus, for example a volunteer can use their smartphone to change the icon on the map so that it represents the vehicle they are driving. This may save the department from having to put an expensive permanently mounted mobile platform on the vehicle. FIG. 3 shows a flowchart illustrating the process 300 of changing an icon by a participant responder. The portion of the flowchart in the lower left, behind the dividing line illustrates subprocesses performed at map book system server 130 of FIG. 1. The other subprocesses illustrated as part of method 300 are performed at the participant responder device. Note that this process changes the representative icon for the participant responder as displayed on all participant devices 302. At block 304, the participant responder device is assigned and being tracked and participants see an icon for the participant responder at his or her reported location on the display. At block 306, the script or other computer program code in the participant responder device is monitoring for the participant responder to press a button to change his or her icon. Nothing changes relative to this feature if the participant responder takes no action at block 306. However, at block 308, when the participant responder indicates that his or her icon is to be changed, input is optionally gathered as to what the new icon is to be. In some embodiments, if a list of possible icons is already available on the screen, this input could be just another button press, or even non-existent if the list is always there or automatically presented.

Still referring to FIG. 3, at block 310, the device then sends a message as shown at block 312. This message is received at the server as shown at block 320. This "change my icon" message causes the server to change the icon for the participant responder device or add an icon or information as necessary on all devices and subsequently send the new information to all participant devices at block 324. Participant devices 302 are then updated with the new icon for the participant responder. Again, the input provided by the participant responder has altered data related to participant display content at the map book server communicating with the participant devices. This in turn caused the map book server to update the electronic display of all participant devices. In parallel, a determination is made at block 330 when the participant responder's state relative to the current event changes to "available" and if so the device icon is reset back to the default personal icon at block 332.

To further illustrate an example embodiment of the invention, consider a responder who uses a smart phone and responds to messaging that was received for an emergency incident. The responder has tapped the "in route" button, and the map book system has changed the state of that participant to "assigned" and is displaying the position of the responder on the screens of all of the mobile platforms of the other participants that received the messaging and are displaying a map page. The responder arrives at the fire station, and then proceeds to drive a tanker vehicle (a large apparatus that carries water) to the incident. The tanker does not have a permanently installed mobile platform. Since the responder has "driver" skills associated with him or her, the responder sees a button labeled "change my icon." Tapping this button then lets the participant responder enter the text string that should now be displayed on all Web pages of all participants and be associated with the participant responder's mobile platform. The net result is that the displayed identity of the participant responder changes from a personal one to that of the tanker. This feature allows anyone who is viewing any map for this event to see the position of the now correctly labeled tanker. The icon on the map screen that was originally associated with the participant responder is no longer displayed. The status of the user is unchanged, and as such the tanker icon shows the same status, typically "in route." Optionally, the original user's status could be changed to "available" and the participant responder would then have to tap the "in route" button in order for the tanker's information in the map book system to reflect the in route status. Alternatively, the individual's state could change to "available" and the tanker would then automatically be "in route."

In some embodiments, the participant responder's original icon may still be displayed and a new icon (for the tanker) would be added to the list of icons for the event. As such, the participant responder would be associated with two displayed icons. The "Z-Index" feature of Google Maps can manage the two icons at one spot, as (typically) the tanker icon could be assigned a higher display priority.

A "map screen" is any screen with a map as a background, such as those provided by the Google Maps library, and with icons displayed on top of the map which denote the location and identity of members of the tracking group. There may be other objects displayed on the map screen, such as buttons to effect state changes, buttons or text areas to change the scale and center of the map, and possibly other housekeeping function buttons. All the normal graphical constructs such as opacity, priority of display (sometimes called "Z-Index"), and concepts of qualifying the display based on the zoom level of the map may be used.

In the above manners, a one-to-one association of a participant and an icon used to represent the participant's position on the map screen of either a mobile platform or a stationary viewer (for example at a personal computer) can be changed. This change in association can be changed again or reverted by the participant responder, or, it can be reset back to the participant responder's default or standard icon when the incident is closed and all participants who were in the "assigned" state are set back to the "available" state. This reset can occur when the call that the firefighter was on ended and allows the firefighter to attach to a new call with their original icon. Optionally, a check box may be displayed in the dialog area where the participant responder indicates what the new icon will be which, when checked, indicates that the participant responder should keep the new icon until such time as it is changed by the participant responder or another user or the system changes the icon to the same one that the participant responder originally selected. This feature would allow a changed icon when used with a fleet of apparatus to stay with the apparatus throughout its shift.

Additional embodiments of the invention can include the capability for a participant responder to "drop items" and thus cause the display of all or at least a plurality of participants to show such an item as a marker indicating an additional location. These additional locations can correspond to the historical locations of the participant responder device, thus leaving a trail showing the participant responder's path through an area. Such dropped items are analogous to leaving a trail of breadcrumbs in the woods, except that they are coordinated by the central server and all participants in the event can see them on the screens of their mobile platforms. This capability might be especially useful in the search and rescue (SAR) context, but could be useful in other situations as well. Alternatively, the dropped item could indicate the fixed position of some feature or item, such as a swimming pool from which water can be used to fight a fire.

Figure 4:
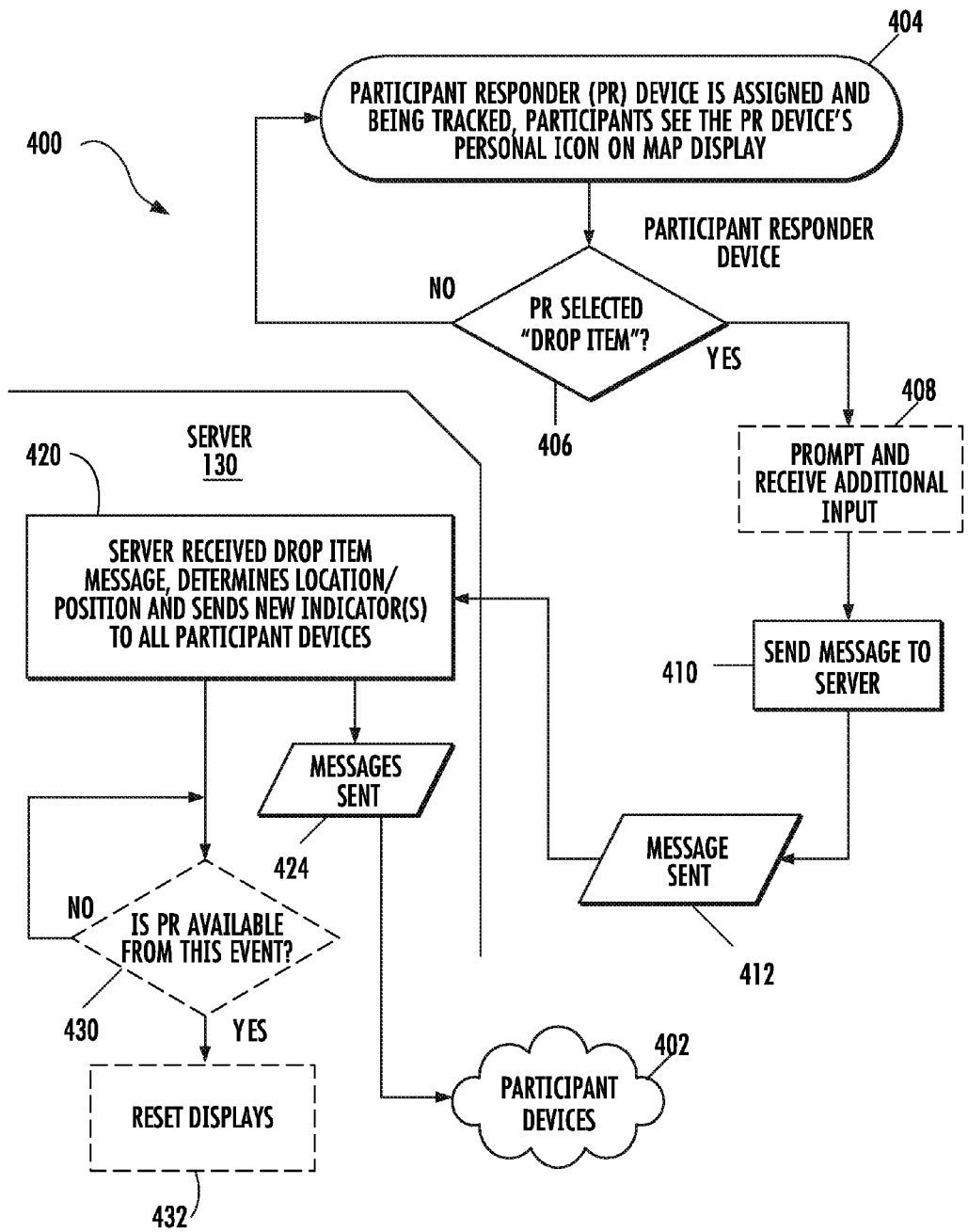
FIG. 4 is a flowchart illustrating the process of a participant responder dropping an item in accordance with various embodiments.

FIG. 4 shows a flowchart illustrating the above process 400 of changing an icon by a participant responder. The portion of the flowchart in the lower left, behind the dividing line illustrates subprocesses performed at map book system server 130 of FIG. 1. The other subprocesses illustrated as part of method 400 are performed at the participant responder device. Note that this process changes the display on all participant devices 402 at the behest of a participant responder who drops an item as described above. At block 404, the participant responder device is assigned and being tracked. At block 406, the script or other computer program code in the participant responder device is monitoring for the participant responder to provide input to drop an item. Nothing changes relative to this feature if the participant responder takes no action at block 406. However, at block 408, when the participant responder indicates that an item is to be dropped, input is optionally gathered as to the type of item, annotation, etc. In some embodiments, for example if only the option of dropping an indication of geographic location or position in order to provide historical positions for the participant responder, the additional input could be non-existent.

Still referring to FIG. 4, at block 410, the device then sends a message as shown at block 412. This message is received at the server as shown at block 420. This "drop an item" message causes the server to determine a location or position for the dropped item and add an icon or information for display and subsequently send the new information to all participant devices at block 424. Participant devices 402 are then updated with the dropped item icon. Again, the input provided by the participant responder has altered data related to participant display content at the map book server communicating with the participant devices. This in turn caused the map book server to update the electronic display of all participant devices. Optionally, in parallel, a determination is made at block 430 when the participant responder's state relative to the current event changes to "available" and if so the electronic displays of all participants can be reset at block 432.

A map book system according to example embodiments of the invention can also maintain a database of address that have had events or any address where information about the location has be entered. The users can then add notes associated with the events via their mobile platforms. Additional information is also stored automatically such as the position of the last incident at this address, the time and date of the last incident (or some number of last incidents), the name of a file or files which have pre-plan information showing the layout of the structure at the address and any other useful information. The next time an incident occurs at this address, the responders can touch the icon on the map page and get access to this metadata for the address. This database may also be set up to let the people or businesses at that address store information that the responders could use, such as information about special needs occupants, pets, or hazards. Such a feature allows occupants at an address keep certain information regarding the address current. Some functionality may involve both logging and messaging.

A map book system according to example embodiments may optionally also provide messaging capability. Messages can be composed by any responder, or may come from a list of pre-determined messages (so-called "canned messages"). Examples of such messages include "needs help", "scene not safe, stage" or "all units stage on road." Messages can be sent to mobile platforms as either text or audio using text to speech techniques or by having the server send an audio file to the mobile platform. Such an embodiment of the map book system may also have the ability to generate both buttons and icons from any text string. Thus, administrators of the system can create buttons for canned messages. In the family vacation context, examples of canned messages might be "found a bargain" or "going swimming." The user can create the text content of these canned messages, and then also specify the button text used to send them. When messages are displayed on participant screens (via the known alert box methods), the name of the participant and the time the message was sent may also be displayed.

In some embodiments, the map book system also has the ability to announce changes of states to all participants who are in the assigned state. An example of this feature would work as follows: When a participant receives the messaging regarding an event, the participant would tap the "in route" key to become "assigned" to the event and to be in the "in route" state. When other participants become attached to the event, their nickname in the system could be announced to all others that are attached. The nickname can be the text string that the icon shows on the map page. This announcement would be triggered by the state change of going into the assigned state. The announcement could be a text to speech version of the nickname, or an audio file the user set up via administrative screens.

A map book system according to embodiments of the invention could operate such that when a new participant becomes assigned, the participant's mobile platform (and only their mobile platform) would receive audio messaging that would announce the nicknames of all other participants that were assigned to this event prior to the new participant becoming attached. In this manner, all participants responding to the event hear audio regarding the status of all other participants in the event response. This feature would allow individual participants with smart phones the ability to respond to the call and be aware of the activities of other participants while being able to keep their eyes on the road.

Additionally, the computer program code implementing an embodiment of the invention can optionally include subroutines that are called on any state change, allowing for the easy addition of other features as desired. Isolating the state change subroutines from the other source code allows for new features to be added without risking the introduction of software errors (bugs) into the core tracking and displaying "engine" of the map book system. This technique also allows for customization of features for a particular user without having multiple versions of the core engine.

A map book system according to embodiments of the invention may also have a database of fixed resources or locations of interest. For the family vacation scenario, these might include locations of the hotel, movie theatre, restaurants, various attractions, parks, restrooms, trail head ends or beaches. For emergency services these might include water sources, stations, hospitals, schools or other locations. For a service fleet, these might include the various supply houses, the main office, major account locations and the like. These resources are classified as to type, and there is the ability to specify for a given type of incident (such as fire, EMS, or SAR) which types of resources will be required. The map book system can then displays only the resources required given the incident. As such, all icons displayed also have a resource type associated with them. In this manner, only the resources needed for the incident are displayed on the map page. For family vacation scenarios, resources might be "shopping", "food", "swimming", "hiking" and the like. A participant initiating an event would specify what resources the event involves. Note that this specification of one or more resources that are relevant to the incident could affect both the initial messaging for the incident and what resources are displayed on a map page.

Through administrative Web pages, administrators of an example map book system may also select how close in distance resources should be to an incident to be rendered on a map page. The mobile platforms tend to be more limited in computational abilities, communications bandwidth and storage than a desktop system. So, for example, a town with 2,000 hydrants could easily present a large computational and communications load for the Web browser on a mobile platform. By restricting the icons for the hydrant resource based on the distance to the incident, a small fraction of the total hydrants would be displayed on a map page. This "distance screening" reduces clutter on the page and reduces the load on the Web browser. It should be noted that if the incident is moved, the distance screening and selection of relevant information should be re-computed and the new icons pushed out to the user of the system. It should be noted that using the zoom level feature of the Google Maps JavaScript software, it is possible to only display hydrants on the map page when the participant is zoomed in to a particular level of closeness. In this manner, the map is not cluttered with icons when zoomed out to a large geographic area. This feature in conjunction with the above-described "distance screened resources" ability produces an advantageous display.

The data structures used with embodiments of the invention have an organization that is well suited for family vacations, businesses, and emergency services. The family vacations and businesses can use a subset of the constructs used for emergency services. For emergency services, there is the concept of an association, such as a county. Then, there is the concept of individual departments which are part of an association. An association can be thought of as the collection of departments that are all dispatched by a PSAP. Resources, be they mobile such as people and apparatus or fixed such as hydrants and stations, belong to departments. There is also the possibility of, for each department, accounting for other departments that work with that department. In the fire service, these are often called mutual aid departments. These multi-department areas are known as regions. This arrangement allows for departments to work with each other either in or outside of their assigned service district and all departments which are involved with an incident can see all the resources required for the incident. The concept of resource ownership also allows departments to administer their resource data, such as hydrant and pond locations, building pre-plans or notes about specific incident addresses. Unlike existing CAD systems, the maintenance of resource information is distributed across the departments with the map book system disclosed herein as opposed to being under the single central management of the PSAP. The structure and administrative architecture of the system is very different from traditional CAD/PSAP systems. This information compliments and exists in addition to the centralized resources of the CAD system. The system can work in varying degrees of cooperation with a CAD system, ranging from nothing more than the initial incident page-out to full and continuous exchange of apparatus and/or personnel status, location and messaging.

The location of fixed resources can be entered manually in files that initialize the map book system database, they can be entered via a Web page, or can be imported via software that can parse and make entries into the map book system's database when supplied tabular data such as might be extracted from a GIS system or a spreadsheet. This capability allows for a county or municipality to have a single GIS system for recording such data, simplifying information management. That data can be extracted for use by the map book system of an embodiment of the invention. A combination of these techniques can be used to create and manage this database of fixed resources. The fixed resources if Google Maps is used can have associated with them some or all of the attributes of: the type of resource; the owner of the resource; the distance filtering criteria for the resource; the status or state of the resource; the position of the resource; the Google Maps Z-Index for the resource; and the Google Maps Zoom level filtering for the resource.

In the embodiments of the invention described thus far, only the "incident page" that a participant has on the mobile platform has been discussed in detail. A map book system according to embodiments of the invention can also support an "uberwatcher," screen to display the position and status of all resources in an administrative group or in a department's near-by region. A region is all the coverage areas of all departments that any given department might respond in. Typically a region is all the districts adjoining a given department, but it can be larger and could even be the entire administrative area. An administrative menu is used to define which close-by departments are in another department's region. This screen may have a resources button to display or hide particular types of resources. The person who is using a Web browser to display the uberwatcher page can also choose to see only a select number of current incidents that are active in the administrative area. It should be noted that other filters could be added such as a list of departments whose resources should be displayed, filtering by time, filtering by resources having moved within the last hour, and the like. Some of the filtering could be user selectable, like the resource buttons, some could be determined by the program, and some could be set by administrative or Web-based screen interfaces.

The icon information passed to the uberwatcher screen by the server can be similar to that passed to a mobile platform. The mobile platform does not necessarily need to know about the type of resource involved with its incident. The mobile platform is only focused on the incident that the participant or apparatus associated with the mobile platform is assigned to. The uberwatcher screen can also be designed so that it should be rendered on a screen size that is larger than a smartphone. A typical screen for a desktop computer or some laptops or tablets might be 1920×1080. A larger monitor, such as a 2560×1440, could provide an overview of an entire association in great detail. The uberwatcher screen could have other features, such as a means to locate specific units on the map, a way to only show the units from the user's department and a button to show the traffic conditions on the roads.

When a single incident is selected on the uberwatcher screen, it can be optionally be configured to display a map that is very similar to what the responders see. For example, available units might be removed from view. Another optional feature is as follows: When a single incident is checked by mousing over or clicking, a button labeled "closest" appears. Pressing the button would take the units closest to the incident and visually highlight them in some form such as bouncing them or changing their appearance. When the button was pressed again, it can show the user a list of the closest fire, EMS and rescue units to the scene. The exact sequencing of the highlighting and list would be up to the designer of the system. This feature may aid in determining which unit should respond to a call. The uberwatcher may also have a button to enable GPS tracking of the uberwatcher user. This allows mobile units to display the uberwatcher's location and also have their location tracked.

With a map book system according to some embodiments of the invention, the system must translate a location description into a latitude and longitude. The Google Maps software can perform this function on a street address. Google calls this Geocoding. Google Maps can usually do this for the intersection of roads. As of this writing, Google Maps cannot do this for locations on the Interstate Highway System (example: I-85 NB at the 160). Google Maps also as of this writing does not provide for "local named locations." An example of such a local named location might be a weigh station on an interstate. An incident that was dispatched might have an address of "I-85 Northbound at the Weigh Station." Sometimes a local business or sports complex is given out as an event address, as in "West Ten Rd at the Eurosport soccer Field."

For interstates, the location of each mile marker and each intersection with a road (be that an interchange or not) is stored in the map book system server. The server may also interpolate over small ranges (such as under a mile) such that fraction mile markers could be used (as in "I-85 at the 160.3). Finally, locations may also be associated with a department in order to help resolve duplicate local names. An example of is "I-85 at the county line." Depending on which department was the primary dispatch, the local named location of "county line" could be at one end or the other of the county for the case of an interstate that passes through a county.

The map book system server according to at least some embodiments of the invention can take any and/or all incident addresses and make a first attempt to resolve them using a mix of parsing software and databases with local named locations. If an address is deemed with software to be on an interstate, the above mentioned database is employed. If the software fails, the system can then use an online mapping system such as Google Maps. Other computer servers with access to local GIS information can also be used. An example of such a server might be a county's (or association's) server having a GIS database capable of taking US Post Office addresses and resolving them down to a latitude/longitude position. Such systems can often give a precise address to a structure location. Often other information that is of use such as the square footage, number of stories, and occupancy type can be obtained. When this process is executed, the resulting information can be added to the information displayed when a participant taps on an incident icon.

Sometimes, the PSAP for an association will not be able to provide a full postal address. Thus, a local address might be "123 Main Street." In these cases, there is an ordered list of towns where the address might be that is maintained on a per department basis. The system tries all possibilities of the address, and stores for each of them an indication of accuracy or quality that is provided by Google Maps. The location with the first best fit is used as the location of the incident.

Another feature of example embodiments of the invention is the ability to display to participants of a first event, and the location of participants in the same department or group that are not associated with that first event or shared interest group. Even if no status information is provided for this second group of participants, the display to the first group of participants can increase situational awareness. An example would be a fire department responding to a specific call can see where other apparatus responding to other calls are located. Thus, a department or group of responders on an incident, who can initially see the status and location of other participants responding to the same first incident, may be able to see at least the location of participants responding to a second incident that might be instantiated for the group.

This "attached to a different call" feature allows for displaying the location and icon for all users in a department or group who are in a state other than "available" or "out of service" on the map page of all users responding to any event. As an example, if a participant responder were a member of a department responding to a first call and then a second call for the same department occurred, as other members of the department responded to that second call the participant responder could see their location on his or her incident page screen. This display would let the participant responder know who is on the other call or calls, and where they are. As such, the participant responder would know those resources are no longer available for the call he or she is responding to. And if further assistance were needed, the participant responder could see who would be closest to help.

The icon used for responders on different incidents could denote that the responders where on another call with some display attribute. In one example system, the icons for those responders have a different color background, thus the display attribute is a different color. In another example system, different icons are used altogether for responders on the second incident, thus, the display attribute is the icon itself. These icons can have all the properties of all icons as far as display zoom level and Z-Index, be that fixed or dynamically determined. Optionally, the icons can display the state of the other users, such as showing they are in route or on scene. Some other graphical characteristic of the icon could also inform responders that the responder represented by those icons were on a different call. Should there be an incident with multiple departments, which also includes members from a participant responder's department, optionally the responding units from all departments could be displayed. Optionally, which responders are displayed can be dependent on their skill set. In a fire service example, the system could be set up so that only officers or apparatus are displayed. For the family vacation scenario, only people with skills matching the member's original incident could be displayed.

In a family vacation situation an example of the use of this feature is a shopping event. Another family member starts a second shopping event. There are now two shopping events going on at the same time with different sets of family members involved with the two events. All of the family members could see on the incident (event) page or its equivalent who is going to the same shopping event, and who is going to the other shopping event (and where they are, and optionally their status). Family members involved in a fishing event would not see the shoppers.

Figure 5:
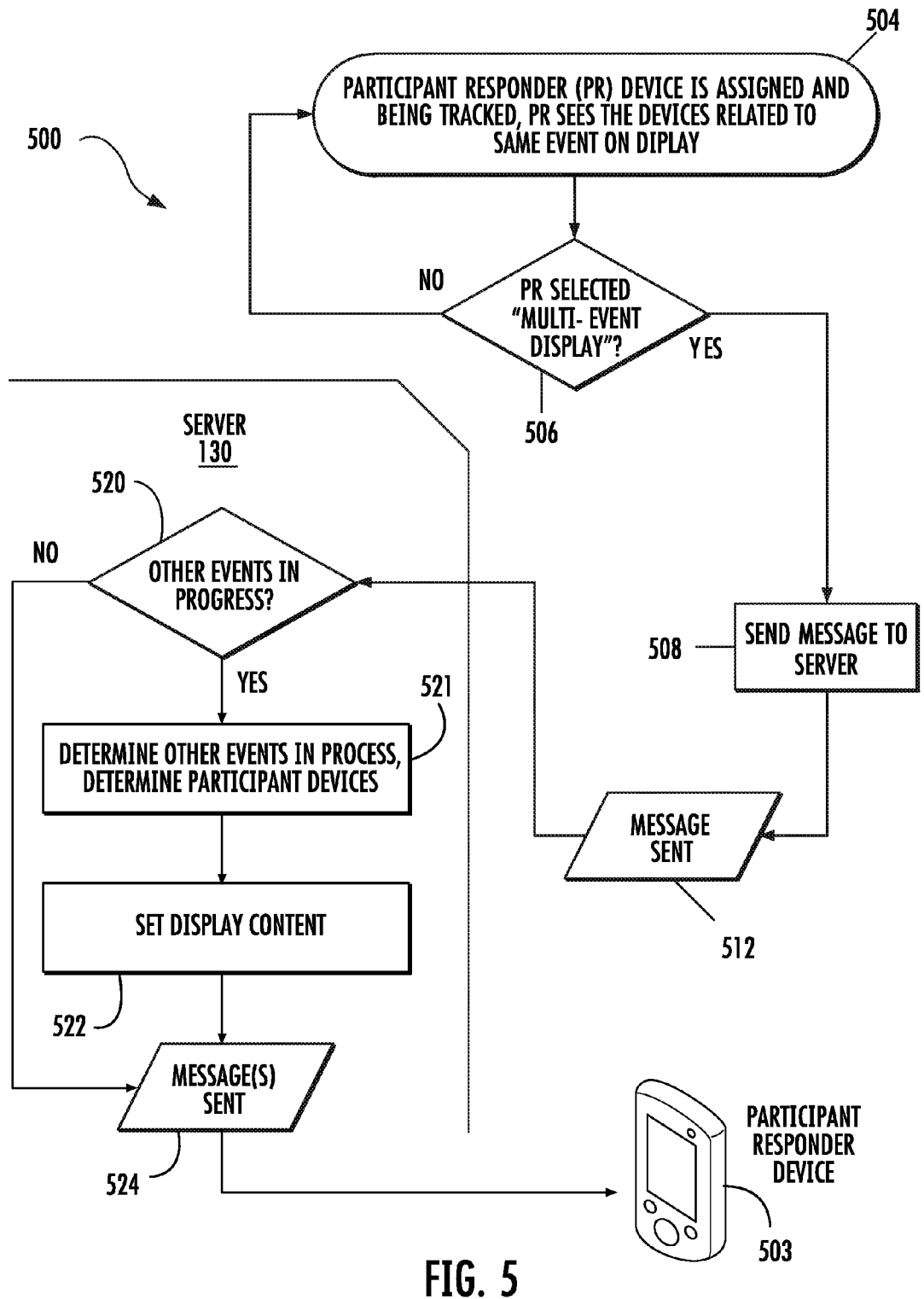
FIG. 5 is a flowchart illustrating the process of a participant responder accessing a multi-event display in accordance with various embodiments.

FIG. 5 shows a flowchart illustrating the method of activating a multi-event display as described above, although a system could be architected so that such a display was automatic. Like most flowcharts, FIG. 5 illustrates process 500 as a series of process or subprocess blocks. The portion of the flowchart in the lower left, behind the dividing line illustrates subprocesses performed at map book system server 130 of FIG. 1. The other subprocesses illustrated as part of method 500 are performed at the participant responder device. Note that this process activates the multi-event display for the participant responder device 503, however, the system could be set up so that the participant responder can activate such a display for all participant devices. At block 504, the participant responder device is assigned and being tracked and participants see the icon for the event at a purported location on the display. At block 506, the script or other computer program code in the participant responder device is monitoring for the participant responder to press a button to activate the multi-event display. Nothing changes relative to this feature if the participant responder takes no action at block 506. However, at block 508, when the participant responder provides input indicating that the multi-even display is desired, the device then sends a message as shown at block 512.

Still referring to FIG. 5, the message is received at the server and a determination is made as to whether there are other events in process that can be displayed as shown at block 520. If so, the "multi-event display message" causes the server to determine participant devices connected with the other event or events at block 521. In effect, the input provided by the participant responder has altered data related to at least the participant responder display content at the map book server communicating with the participant devices at block 522. This in turn causes the map book server to send message 524 to update the electronic display of at least the participant responder device. Note that if no other events are in progress at block 520, message 524 is sent; only in this case, message 524 indicates that there are no other events for which information can be displayed. It would also be possible to configure the system so that participating responders always see other events for their departments without a selection step.

Some embodiments of the invention include a display of a responder-incident linkage line. When there are multiple events taking place at once, and there are multiple people or apparatus responding, it can be confusing as to who is going where. A solution for this problem is to add to the map a line between the icon for each responder and the icon representing the incident. In its simplest form, there could always be a line between all responders and the incident they are committed to.

Additional enhancements may include, for example, a red line when the responder is in a state of "in route" to an event and a green line if the responder is "on scene" at an event. A line connecting a responder to an event that shows they are on scene may appear to be somewhat unnecessary. However, if for some reason the marker on the map was in the wrong place, either a participant in an event or someone watching a group participate in an event could tell if the marker might be in the wrong place when they see a responder's icon indicate that they were "on scene" even though they were not close to any incident icon. If there is just one event taking place, this is not a problem. But if there were multiple events taking place at once, the line eliminates the confusion as to who is associated with which event. This confusion is worse if the event marker is in the wrong place.

Note that different color lines could be drawn for each possible state a responder can be in. Another enhancement is to only draw the line under certain criteria. For example, the line connecting a responder to an incident might only be drawn if the responder were more than 500 feet from the incident. This would reduce map clutter if a viewer was zoomed in on the map and the responder was close to the incident. Another enhancement would be to only draw a line between an icon representing a participant in the "on scene" state and the icon for the incident if the participant is more than a certain distance, for example, a half mile from the incident. Another enhancement is to enable the ability to click on the line and see who the responder is. Additional information such as distance between the event location and the responder could also be displayed along with other information. The lines may be drawn on the incident page, the uberwatcher page or any other map page. The user may also have a means to configure their map such that the drawing of these lines would be either enabled or disabled. This configuration could also include the enabling of a line on a per-state basis.

The map book system in some embodiments could also present a "PSAP page." This page lets either department or PSAP personnel manage an active incident. Like the park page, the PSAP page shows the active incidents. Typically only users with administrative skills can use the PSAP page. The qualified user can edit the location and incident text, change the icon, or go to the incident page to move the incident, make a log entry, or send an incident message just like a responder. Optionally, the PSAP page may allow the user to display the log files for the incident in progress thus far. This feature allows the user to get a history of the incident. The PSAP page can also have a menu that lets the user instantiate an incident. This option could be for training, or for times when the PSAP was down or overwhelmed. This menu would let the user select all the various information needed to page out an incident. The incident can be created and optionally paged out (messaging sent to responders). If it is not paged out, the edit incident screen can be used to page out an already filled out incident when the time is right.

For calls that involve multiple departments, the PSAP Page would allow the user to display each department individually, or to consolidate them under one line as would typically be seen on the uberwatcher page. The individual listing lets the user bring up the incident page for a specific department so that the department can be cleared from the call. The PSAP page, like the park page may also have a feature providing for the ordering of calls to be dynamic. For example, calls could be ordered either by the age of the call with the newest call at the top of the page, or by distance between a responder and the incident, where the closest incident is at the top. The ordering could be either manually set or be switched automatically based on the number of calls pending for a department. In some embodiments, during times of heavy call volume such as weather events the system can dynamically change the display order to best suit the situation. Responders can be trained to take the call at the top during peak load times and to otherwise respond to the most appropriate incident.

As previously mentioned, an instruction execution platform or platforms including a processor or processors can be used to implement an embodiment of the invention. An exemplary instruction execution platform is illustrated as map book system server 130 of FIG. 1. Participant devices 110 and 122 of FIG. 1 can also carry out some functions of an embodiment of the invention. Any such processor may be a general purpose processor, a digital signal processor, an embedded controller, or even a processor pre-wired to execute all or a portion of the algorithms described herein, such as a field programmable gate array (FPGA). The processor could also be a fully custom gate array or application specific integrated circuit (ASIC). Any combination of such processing elements may also be referred to herein as a processor. Firmware, software, or microcode can be stored in a non-transitory form on or in a tangible medium that is associated with the processor.

Figure 6:
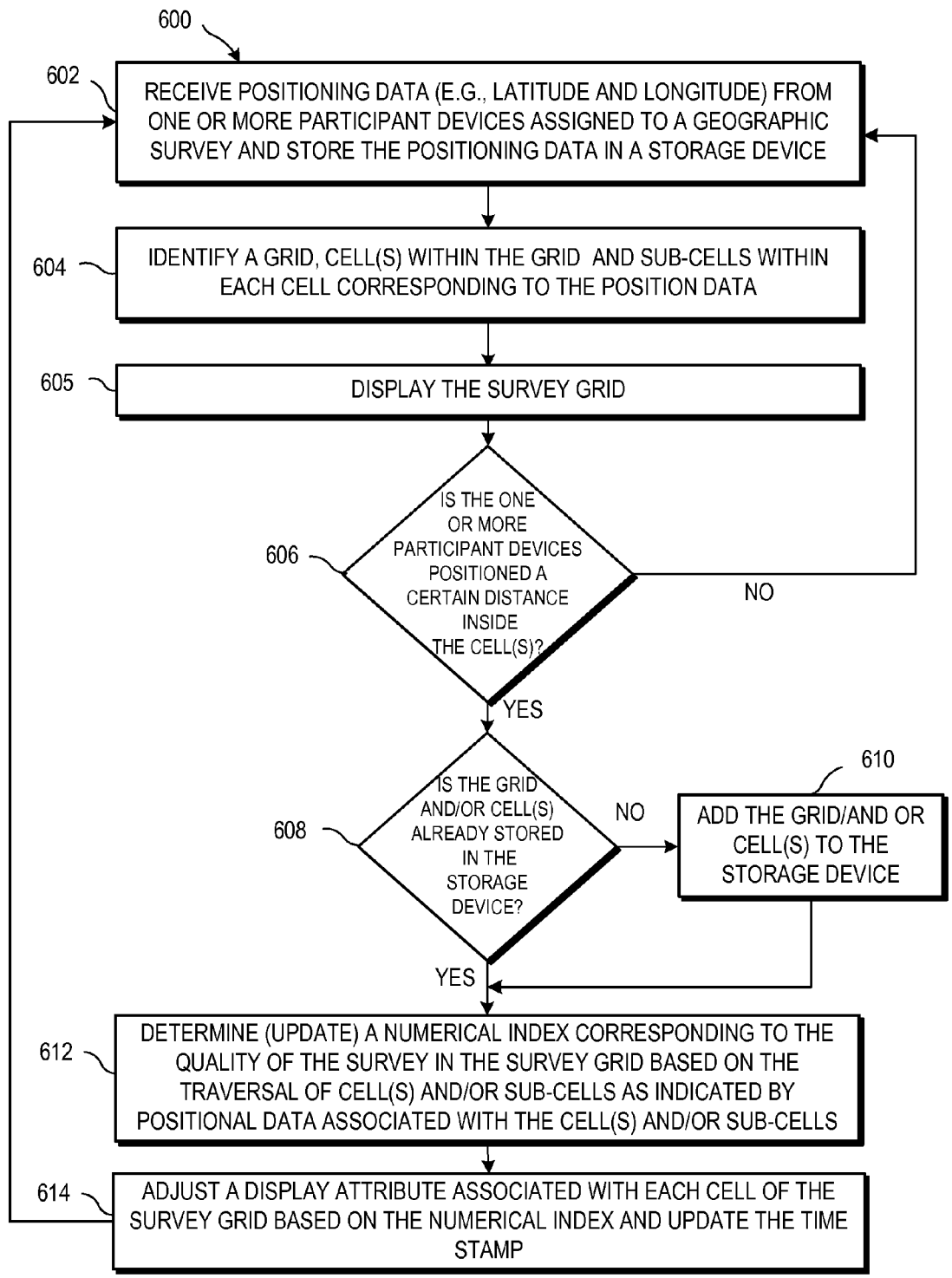
FIG. 6 is a flowchart illustrating a process for displaying an indication of quality of a geographic survey in accordance with various embodiments.

Referring now to FIG. 6, a flowchart illustrating a process 600 for displaying an indication of quality of a geographic survey is provided. One or more devices, such as the one or more computing devices and/or servers of FIG. 1, can be configured to perform one or more steps of the process 600. In some embodiments, the one or more devices performing the steps of the process 600 are associated with a business, partner, third party, and/or user.

The geographic survey includes operations associated with a defined geographic area. In some embodiments, the geographic area is defined by geographic boundaries of one or more towns, a zip code, a specific track of land, and the like. Exemplary geographic surveys include search and rescue (SAR) operations, non-rescue oriented searches, searches for animals, searches for people, searches for bodies, searches for dangerous items, searches for criminal evidence, political canvasing operations, sales operations, product survey operations, delivery operations, forestry operations, farming operations, and the like. For example, emergency service personnel are frequently involved in SAR operations where many responders are engaged in a search for a lost person. An example of an emergency SAR operation is looking for a person who is believed to be in a particular geographical area such as a park, neighborhood, or rural area. Such operations involve many responders who attempt to "comb the area" and locate the person. Note that searchers could be animals as well, such as rescue dogs with collars to which battery operated GPS devices have been affixed.

As illustrated at block 602, positioning data from one or more participant devices assigned to a survey is received and the participant data is stored in a storage device (e.g., a storage device associated with the participant computing device 110 or the non-transitory storage medium of the map book system server 130). In some embodiments, the positioning data is automatically received from the one or more participant devices. In other embodiments, a participant inputs the positioning data and sends the data to the system of process 600. In further embodiments, the positioning data comprises GPS (geographical positioning system) data received from a GPS device associated with the one or more participant devices. The positioning data includes, in some embodiments, a latitude and longitude of the one or more participant devices. In other embodiments, the positioning data comprises an address, a road name, intersection identification, a highway mile marker, a landmark, or any other information associated with the location of the one or more participant devices.

The one or more participant devices can include a mobile device or other computer device that is associated with a specific trackable entity such as a person or a vehicle. In some embodiments, the one or more participant devices are associated with a participant or participant vehicle. Participants include any entity that is associated with the survey. Exemplary participants include searchers, emergency personnel or responders, canvassers, sales personnel, divers, vehicle operators, robots, and the like. Exemplary participant vehicles include emergency response vehicles, tankers, helicopters, planes, farming equipment, construction equipment, drones, and other vehicles.

In additional embodiments, the device-to-person or device-to-vehicle association can be dynamically changed for a period of time. An example of this situation is volunteer firefighters who have smart phones associated with their person. When the firefighters get into an apparatus, such as a tanker, the firefighters can then change the association of their smart phones from themselves to that of the tanker. This then allows those viewing the map of responding units to see that a tanker is part of the emergency response for a given incident. This association functionality can also be applied to a motor pool of vehicles. A driver can select a working vehicle from the pool and then assign that vehicle an identifier that can be used on the displayed maps.

In further embodiments, a mobile tracking unit can be deployed instead of a mobile platform device. In such cases, participants do not necessarily need to see any screens that would show the quality of the search. The mobile tracking devices may be cheaper to use or be more suited for an outdoor environment if they were implemented in a waterproof case than if a mobile platform device was used. The use of mobile tracking devices allows for those in charge of the survey to distribute mobile tracking devices to all participants, even those with no skill in participating in a survey with a cooperative group of members in a tracking unit. The server system can be pre-programmed with the unique identifiers of the mobile tracking units and can use the GPS locations of the mobile tracking units to drive a dynamic survey grid software engine associated with the process 600. This also allows for the provisioning of a number of such devices to facilitate rapid deployment of searchers.

In further embodiments, parameters for the geographic survey area are pre-programmed or configured by the participants. For example, responders involved in SAR operations can "drop items" such as a marker into the map display. The responders select an icon to drop at their current location, and all participants see that on their map displays. They can also leave a trail showing their path through an area. These dropped items are analogous to leaving a trail of breadcrumbs in the woods, except that they are coordinated by the central server and all participants in the SAR operation can see them on the screens of their mobile platforms. The ability to drop items is also of use whenever a participant wishes to mark a location for the benefit of other users even in non-SAR operations. Dropped items can also have attributes automatically entered for them, such as the location of a landing zone for a helicopter. Other users in the system can tap on the icon and see the exact latitude and longitude in addition to optional information entered by the person who dropped the landing zone or any other item.

As illustrated at block 604, a grid corresponding to the position data, one or more cells within the grid corresponding to the position data, and sub-cells within each cell corresponding to the position data are identified. In some embodiments, the survey grid is divided into at least one cell. Each cell of the grid, in some embodiments, is divided into sub-cells.

As illustrated at block 605, the survey grid is displayed. In addition to the display being managed by the server of the process 600, the display of the survey grid can also be managed on each participant's device with, for example, JavaScript code that manages an array of the cells of the grid instead of having the cells be managed on the central server. Since each device has the latitude and longitude of all responders involved in the search, the device can perform the same algorithm as the server.

In some embodiments, the survey grid corresponds to the geographic boundaries of a dynamically created survey area, where the displayed grid expands based on the geographic movements of the survey participants. For example, geographic surveys can be organized and progress tracked by mapping out a survey grid of 100 meter squares. The location of the participants associated with the survey can be used to dynamically create and maintain the survey grid areas by using the locations of all the participants involved in the survey. In this way, a map display that shows the search grid area can be dynamically created to indicate not only the area the participants have covered, but also indicate the quality of the search thus far across cells of the search grid.

As the survey participants traverse the survey area, their GPS coordinates are sent back to a server (e.g., the map book system server 130 of FIG. 1). The server stores a fixed grid with some resolution, for example 100 meters on a side. As participants enter a cell (e.g., a square) on the grid, the server remembers that at least one participant has been in that cell. On the display of the mobile platforms of the one or more participant devices, a square that is the same size as the survey cell is drawn (see FIG. 9). As time passes and the searchers comb the search area, the survey grid is dynamically created. This grid can be viewed by the participants or by anyone with access to a Web browser who can access the server such as personnel supervising the survey. This allows for agencies who are not part of the cooperative group of tracked entities "in the field" to see the locations of the participants and the resultant dynamically rendered survey grid. In this way, officials in charge of the survey can see which areas have been searched.

The search grid process can be initiated by the press of a button on the display of a participant with the correct skill set, such as an "Officer." The grid can be cleared or reset with another button on the display screen of the "Officer." In this way, participants in the search are prevented from accidentally clearing all the search data.

Figure 7:
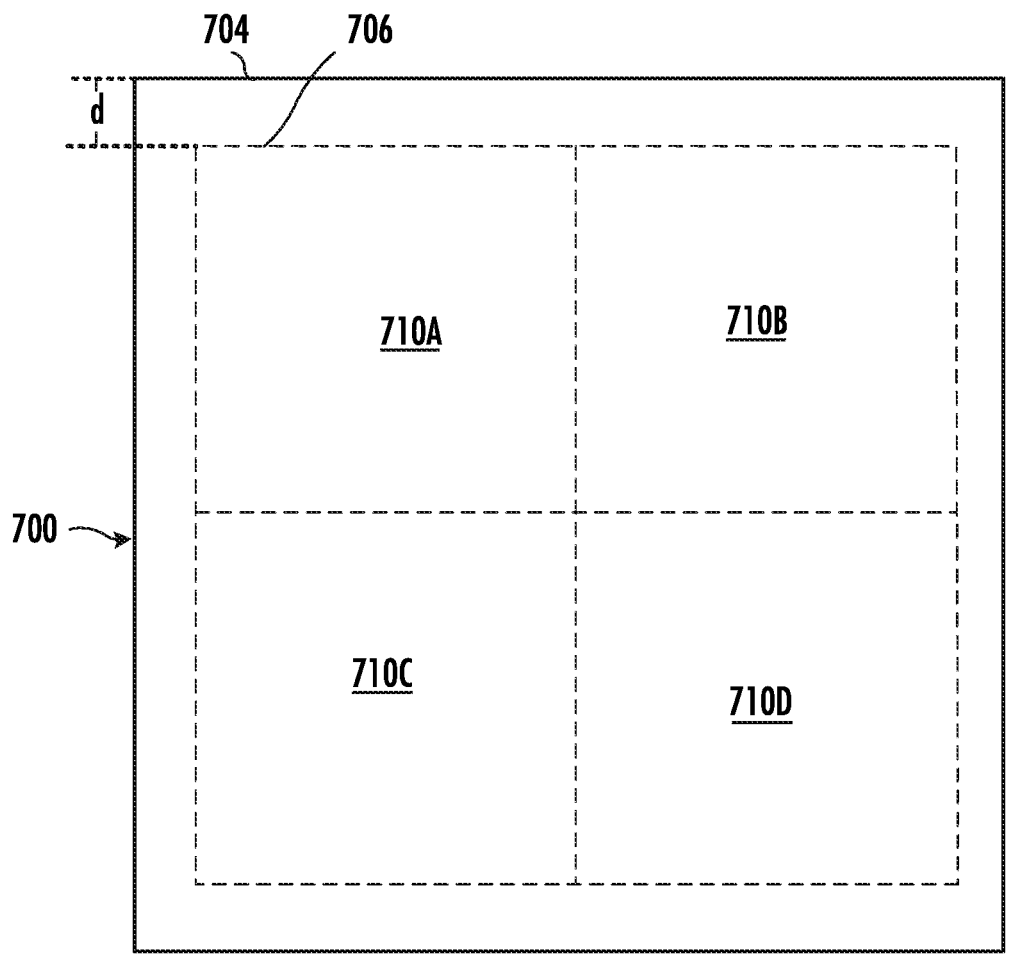
FIG. 7 illustrates a cell of a survey grid in accordance with various embodiments.

As illustrated at decision block 606, a determination is made as to whether the one or more participant devices are positioned a certain distance within the one or more cells. FIG. 7 illustrates a cell 700 divided into sub-cells 710A-D. As shown in the illustrate embodiment, the cell 700 is in the shape of a square, and the sub-cells 710A-D are represented as equally sized squares within the square cell 700. The strip of space between outer edges 706 of the sub-cells 710A-D and perimeter or outer edges 704 of the cell 700 is defined by a distance d between the outer edges 706 of the sub-cells 710A-D and the perimeter 704 of the cell 700.

In some embodiments, the participant is not counted as having entered a cell until the participant is a pre-selected distance inside the perimeter of the cell. For example, a participant may not be counted as having entered a cell until the participant is a distance that is greater than or equal to the distance d inside the cell. The participant, in some cases, may not be counted as having entered the cell 700 until the participant has crossed the outer edges 706 and is within one of the sub-cells 710A-D. Although the predetermined distance in the illustrated is greater than or equal to distance d in the illustrate embodiments, it will be understood that the predetermined distance can be any distance.

In some embodiments, the predetermined distance applies to participants who are in contact with the ground surface associated with the cell area and participants who are not in contact with the ground surface of the cell area. For tracking purposes, the participants include those who are walking on the cell area terrain, those flying or otherwise positioned above the cell area, and/or those positioned underground in the cell area. In other embodiments, the predetermined distance includes a horizontal distance component and/or a vertical distance component. For example, the predetermined distance extends above the plane of the cell surface area and below the plane of the cell surface area. Although a square shaped cell is illustrated in the figures, it will be understood that the cell and the sub-cells may be in any shape or size. For example, a circular grid (e.g., a grid associated with a stadium or pond) may include ring shaped cells and/or circle shaped cells.

In further embodiments, the participant is not counted as having entered a cell until the participant is inside the cell by a certain percentage. For example, the system of process 600 may define "being in a grid" as being inside of a fixed cell by a certain percentage or by a certain distance. This avoids the problem of a responder whose search path is along the boundary of two cells as being counted as having searched both cells due to the jitter of their GPS location. For square shaped cells, the certain percentage may be defined as a percentage of the side length of square. In a 10% example, a participant would have to be 10 meters inside the edge of a square cell having an area of a 100 square meters to be counted. If this distance is measured relative to the edge of a sub-cell, the distance in some embodiments can still be a percentage of the side length of the entire cell. For circular cells, the certain percentage may be defined as half of the radius of the circle. It should be understood that the various parameters of the search grid such as the size, percentage of inside the cell, and details on any sub-cell sizes can be either fixed and/or inputted by the user.

If the one or more participant devices are not positioned at the certain distance within the one or more cells, then the process 600 reverts back to the step illustrated at block 602. If the one or more participant devices are positioned at certain distance within the one or more cells, then another determination is made as to whether the grid and/or the one or more cells are already stored in the storage device as illustrated at block 608. If the grid and/or the one or more cells are not already stored in the storage device, then the grid and/or the one or more cells are added to the storage device as illustrated at block 610. For example if the grid and/or cells are entirely new, then they are first stored before proceeding with the process 600.

As illustrated at block 612, a numerical index corresponding to the quality of the survey in the survey grid is determined based on traversal of the cells as determined by the position data associated with the one or more cells and/or sub-cells over time. In some embodiments, the numerical index is based on the number of times any participant has entered a cell or sub-cells. In one example, if twenty different participants enter a cell, then the participant entrance level for that particular cell is greater than or equal to 20. In another example, if two participants enter a cell 10 different times, then the participant entrance level for that cell is 20. In additional or alternative embodiments, the numerical index is based on the number of times any unique participant has entered a cell or sub-cells. For example, the numerical index may be based solely on the number of FBI agents or other specialized participants who enter a cell and not based on the total number entrances. In still further embodiments, the numerical index is based on the number of sub-cells within a cell that have been occupied by at least one of the one or more participants. For example, in a cell comprising eight sub-cells, if seven participants enter one sub-cell, two participants enter a second sub-cell, and no participants enter the remaining sub-cells, the sub-cell occupancy rate would be 25%.

As illustrated at block 614, a display attribute associated with each cell of the survey grid is adjusted based on the numerical index and a time stamp associated with process 600 is updated. The grids are expanded and a stored quality metric for a cell is updated over time, but the exact historical positions of participants do not need to be saved, making for a storage efficient algorithm. Exemplary display attribute include a fill level or opacity of a cell, a cell color, a rating associated with a cell, and the like.

Figure 8:
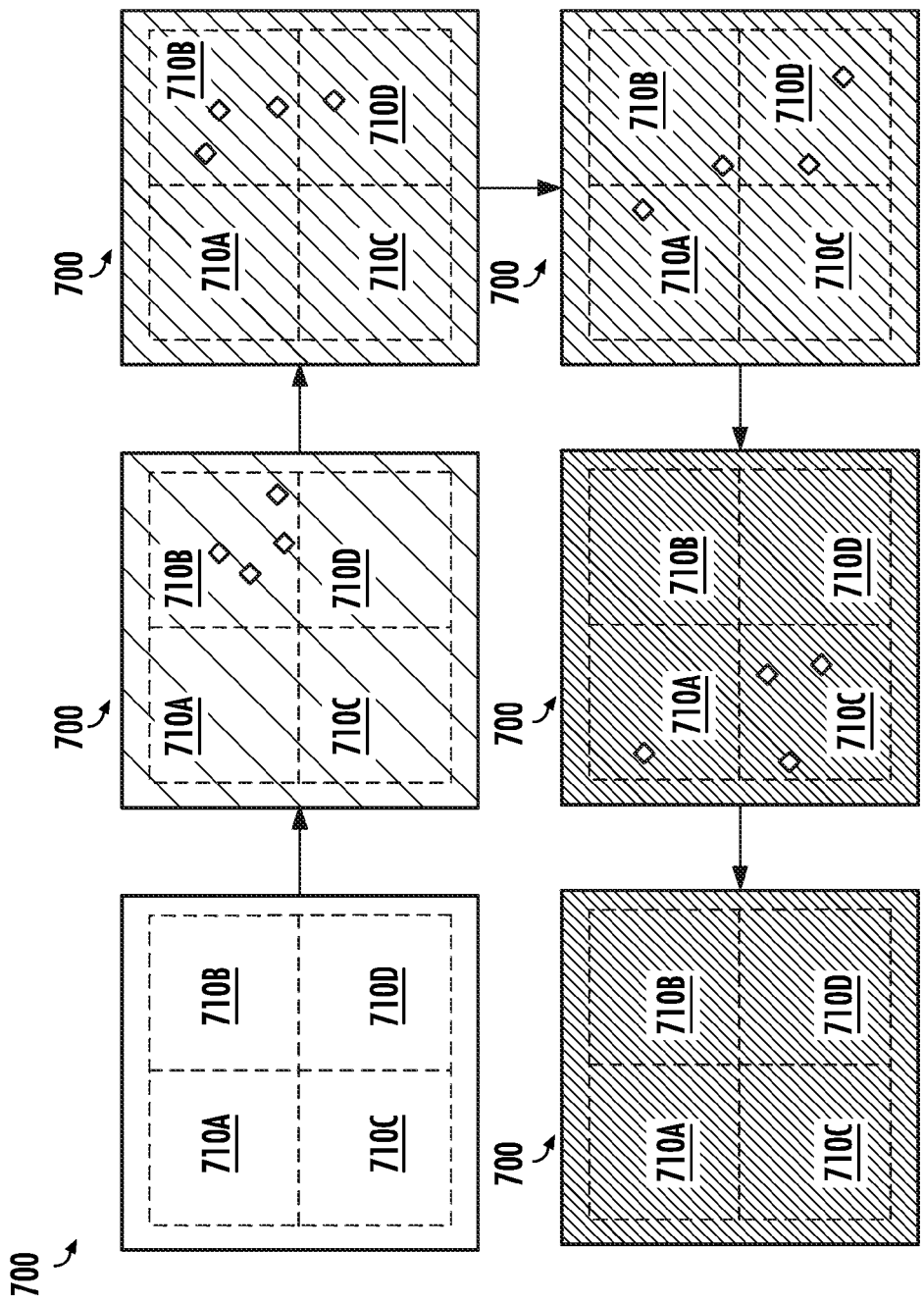
FIG. 8 illustrates changing display attributes of a cell in accordance with various embodiments.

FIG. 8 illustrates the display attributes of the cell 700 of FIG. 7. In the illustrated embodiment, the cell 700 is divided into the four smaller and equal sub-cells 710A-D. As participants and their associated devices (illustrated as diamond icons) enter the sub-cells 710A-D, the server keeps track of which sub-cells 710A-D have had any participants in them. The opacity of the cell changes as more of the smaller sub-cells are occupied by the participants. In the case of the four small sub-cells 710A-D of FIG. 8, the opacity of the cell 700 is 10% because only sub-cell 710B has been occupied by participants. When two sub-cells 710B and 710D are occupied by participants or have been traversed by participants, the opacity of the cell 700 changes to 20%. When three sub-cells 710A, 710B and 710D are all occupied or visited by participants, the opacity of the cell 700 changes to 30%. And when all sub-cells 710A-D are occupied or had participants in them at some time during the survey operation, the opacity of the cell 700 changes to 40%. Thus, the relative opacity of the cell 700 indicates the quality of the search of that grid. Even if the cell or any of the sub-cells are completely unoccupied at a later time, the opacity of the cell 700 remains at 40% or darker to indicate the quality of the search that area of the grid. The advantage of the display attribute approach is that the number of square or rectangular grid objects that the mobile platform has to render and store is reduced by a factor of four. This reduces the load on the mobile platform and the communications load, and improves the responsiveness of the system. The resulting display is easily understood by the officials in charge of the survey and the responders who may also see the grid on their mobile devices.

An additional or alternate way to define the quality of the survey would be to count the number of responders who have been in the grid and base the opacity on this number. For instance, the opacity of a cell would be 10% if 10 participants entered the cell, 20% opacity for 20 entering participants, and so forth. The opacity, in other embodiments, is based on the percent of total participants that have entered a cell or sub-cells. For example, if the total number of searchers in a SAR operation is 200 and if 5% of the total number or searchers (i.e., 10 participants) enter a cell, then that cell would be updated to have an opacity level of 15%. It should be clear that a variety of algorithms can be used to determine the opacity of the grid.

Figure 9:
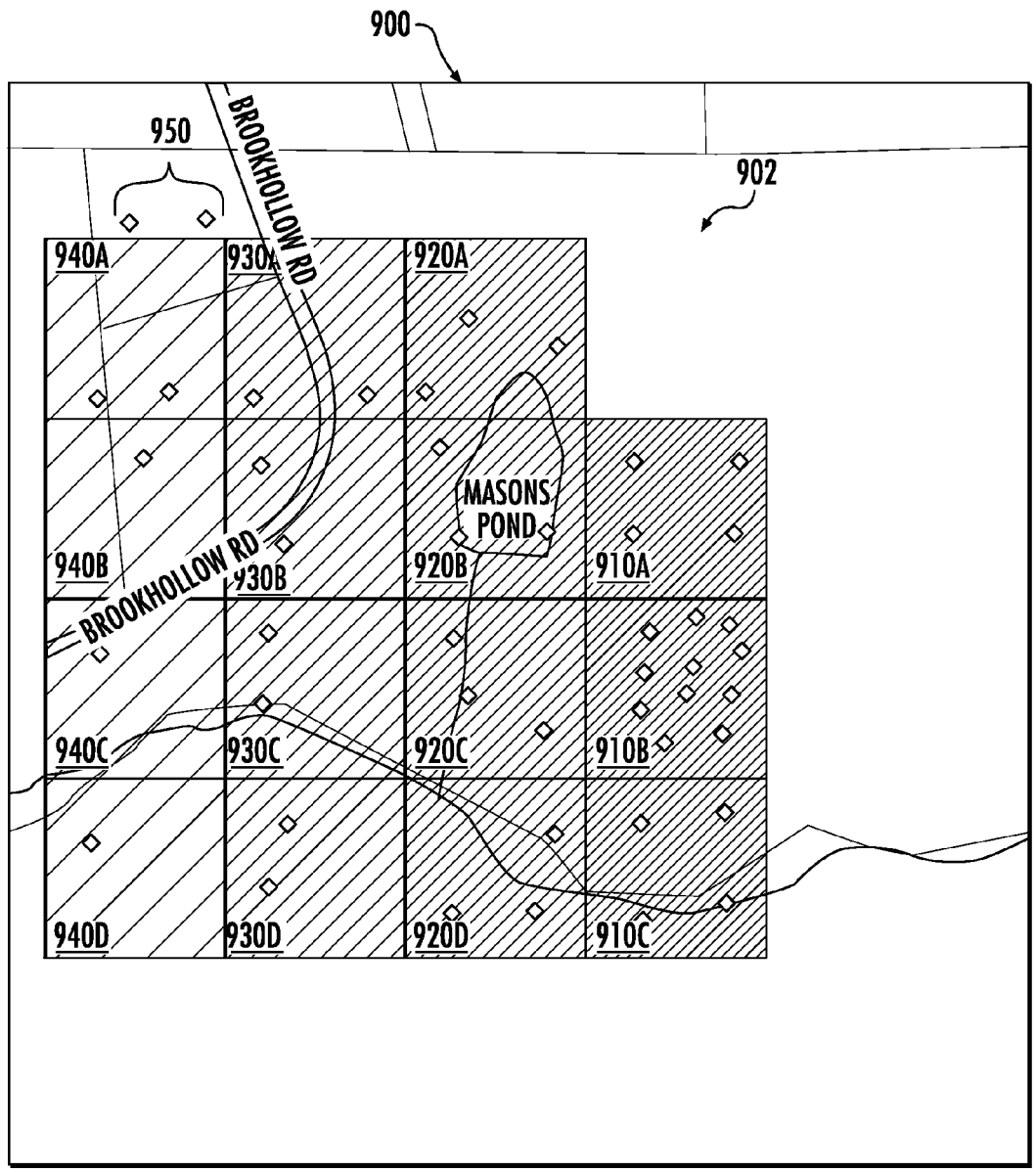
FIG. 9 illustrates a graphical user interface (GUI) of a map display including a survey grid in accordance with various embodiments.

Referring now to FIG. 9, an exemplary GUI 900 of a map display showing a grid 902 is provided. The grid 902 is divided into cells 910A-C, 920A-920*d*D 930A-930D, and 940A-940D. The diamond icons in each of the cells represent the positions of one or more participant devices. The cells 910A-910C have a high opacity level compared to the other cells in the grid 902 due to a numerical index associated with the cells 910A-910C. For example, the cells 910A-910C may have an opacity level of 40% because at least four participants are positioned in each cell or because at least one participant occupies a certain number of sub-cells (now shown) in the cells 910A-910C. The cells 920A-920D, in the illustrated embodiment, have a 30% opacity level because there are three participants in each of the cells 920A-920D or because each of the three participants occupy three sub-cells (not shown). Similarly, 930A-930D, in the illustrated embodiment, have a 20% opacity level because there are two participants in each of the cells or because each of the three participants occupy two sub-cells (not shown). The cells 940B-940D have the lightest opacity as there is only one participant located in each cell. In some embodiments, the opacity level of the cells remains the same even after the participants have exited the cells. As the four sub-cells are traversed by participants, the opacity of the search cell comprised of the sub cells changes to indicate the degree or quality of the search. For example, the system may remember that at least one participant has traversed each sub-cell of a cell such that the opacity level remains at 40% even after all participants have left the cell. As such, when all of the participants return to a staging area for the incident, the displayed map shows the quality of the survey that was just performed.

With regard to cell 940A of FIG. 9, the opacity of this cell may by only at a 10% level despite having two participants occupying the cell because the cell may have numerical index parameters that are different from the parameters of other cells in the grid 902. Also, the system may not have yet updated the display attribute of the cell 940A. Outside devices 950 depicted as diamond icons positioned outside of the grid 902 are tracked, but a new cell was not created because the outside devices 950 are positioned too close to the edge of the grid 902. Once the outside devices 950 move a certain distance from the edge of the grid 902, a new cell can be created.

Figure 10:
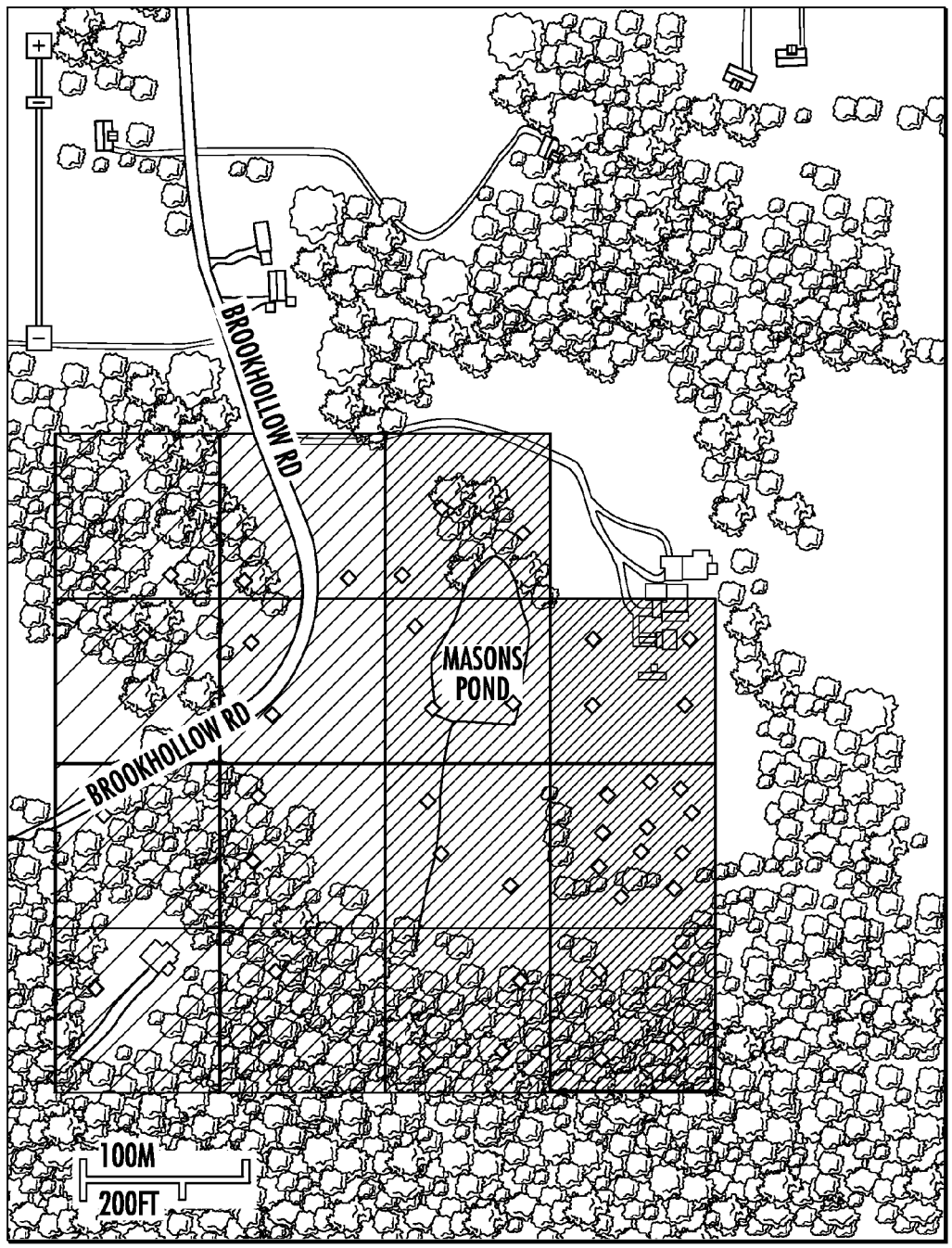
FIG. 10 illustrates a GUI of a map display including a survey grid in accordance with various embodiments.

As shown in FIG. 9 and also in FIG. 10, the grid 902 is semi-opaque, which lets the survey viewers see the underlying map display or the satellite display, as well as a tinted grid indication. Although the display attribute presented in the illustrated embodiments presented herein relate to levels of opacity, it will be understood that the quality of the survey associated with a cell can be displayed in any way. For example, the fill levels may all be the same but the color of the fill associated with various cells may differ. A red cell having a 20% fill level may indicate that the cell has been searched in all sub-cells while a blue cell having a 20% fill level may indicate that only 1 sub-cell within the cell has been searched. In another example, the quality of the survey may also be indicated by the color of the cell borders or the line weight of the cell borders. In still other examples, the display attributes may include watermarks, assigned numbers or symbols in a corner of the cells, and the like.

Referring again to FIG. 6, the process 600 repeats following the step illustrated at block 614. In some embodiments, the process 600 repeats until the survey is temporarily or permanently completed. In further embodiments, the Web browser on the one or more participant devices has programs written in JavaScript. Periodically, the browser connects back to the server associated with the process 600 via a connection such as TCP or UDP, and then uses the Ajax (Asynchronous JavaScript and XML) protocol to exchange information. The participant's mobile platform will send its location, information about any button presses, and the last time it had an update to the server.

In additional embodiments, the server checks a number of databases. These databases can be maintained using software such as a MySQL server. An "item" database contains all items that have a position associated with them. Each item also has the last time the item was updated. If the item was updated after the browser's last update time, the server will send the item information back to the browser so that it can update its database of items and update the map page that the survey viewer sees. It should be noted that when this style of embodiment is used, the participants will see both the historical quality of the survey and the current location of each participant at the same time. Additionally, the SAR display discussed above and with respect to FIGS. 6-10, can be enabled simultaneously with any other displays related to other features disclosed herein. Also, multiple SAR grids could be displayed at once for different surveys, perhaps using color coding or other highlighting. Finally, provision can be made to reset the index and start over. This capability could be useful, for example, when a search is re-initiated in the same area after some period of time either because it is thought the subject of the search has moved, or there is a desire to resurvey the area as a double check.

In a HTML 5 implementation, the survey grids can be loaded from the server to the browser in a similar fashion. Any grids or cells that have changed can be sent to the browser as part of the Ajax reply, the browser can then update its local database or storage arrays and then update the map display page. In this fashion, information is periodically exchanged between the mobile platform and the server. The use of time stamps limits the information to only that information that has changed since the last exchange of information. The Web browser software may use a variety of algorithms to decide when to initiate an Ajax exchange. In one embodiment, exchanges occur when the position has moved by amount greater than the position jitter of the GPS, or after a certain time has passed. The certain time may be, for example, a fixed time or a time set by the server. The rate of exchange, in some embodiments, is dependent on the speed of a moving mobile platform. The tuning of the algorithms that have the browser checking in with the server balances the bandwidth on the cellular networks and the load on the server.

In cases where the system is implemented with custom software on the mobile platform, the implementer may elect to have a persistent TCP connection with the server. While the method of the connection may be different, the periodic synchronization step of the browser and the server is still performed to ensure that the storage of member locations, the member icons, the survey grid, and any other information that is common to both ends of this system are identical to each other. Further, even if either platform initiated a TCP connection to the other, and then synchronized data via some means other than the Web based Ajax, the synchronization step would remain the same.

Connectivity between other types of systems, such as a computer aided dispatch (CAD) system can also be accomplished using the methods described hereinabove. A CAD system with knowledge of the status and location of its apparatuses could connect to the Ajax routines of the map book system server 130 and report a number of updates on position and status. And in the process of conducting this communication, the CAD system can change the status and location of all the apparatuses in the system associated with process 600 that are operably connected to the CAD system, allowing the CAD system to update information for the users of that system. As such, the map book system server 130 can be interoperable with existing CAD systems. The status information of the members may have to be altered or reformatted into states that are compatible with the CAD system. Alternatively, an icon with different graphical characteristics can be used for apparatus information received from a CAD system that did not have matching status classification in the map book system.

In some embodiments, a knapsack with a special top pocket/pouch is provided. The participant's ability to move, travel, work, etc. while using a mobile device in the system can be enhanced by the knapsack, which includes a sky facing top pocket for a Phone/GPS unit or other device. Consider the survey grid features previously discussed. When any field operation using the book map system is in progress, participants may have difficulty holding and keeping their cell phone available without causing damage to the phone. For example, if the participant is to be tracked, the participant needs a good view of the sky and the phone should be up in the air and not in the user's pocket.

The knapsack includes, in some embodiments, a spacer device to keep the display of the phone or other device facing up. The spacer allows for an external battery that can be used to power the phone. The top of the pouch is configured to be rain resistant. The knapsack is also configured to not block RF signals in the cellular and GPS bands, as well as audio so that the participant can hear an alert due to an incoming message. In further embodiments, the knapsack includes a clear top through which the user can see the display of the cell phone or other device. The clear top, in some embodiments, has a flap that is configured to cover the clear pouch to keep the screen of the phone out of the sun. In additional embodiment, the knapsack further includes a strap or VELCRO® strip that is configured to keep the pouch cover in place. In still further embodiments, the knapsack includes a variety of other pouches for other uses.

Figure 11:
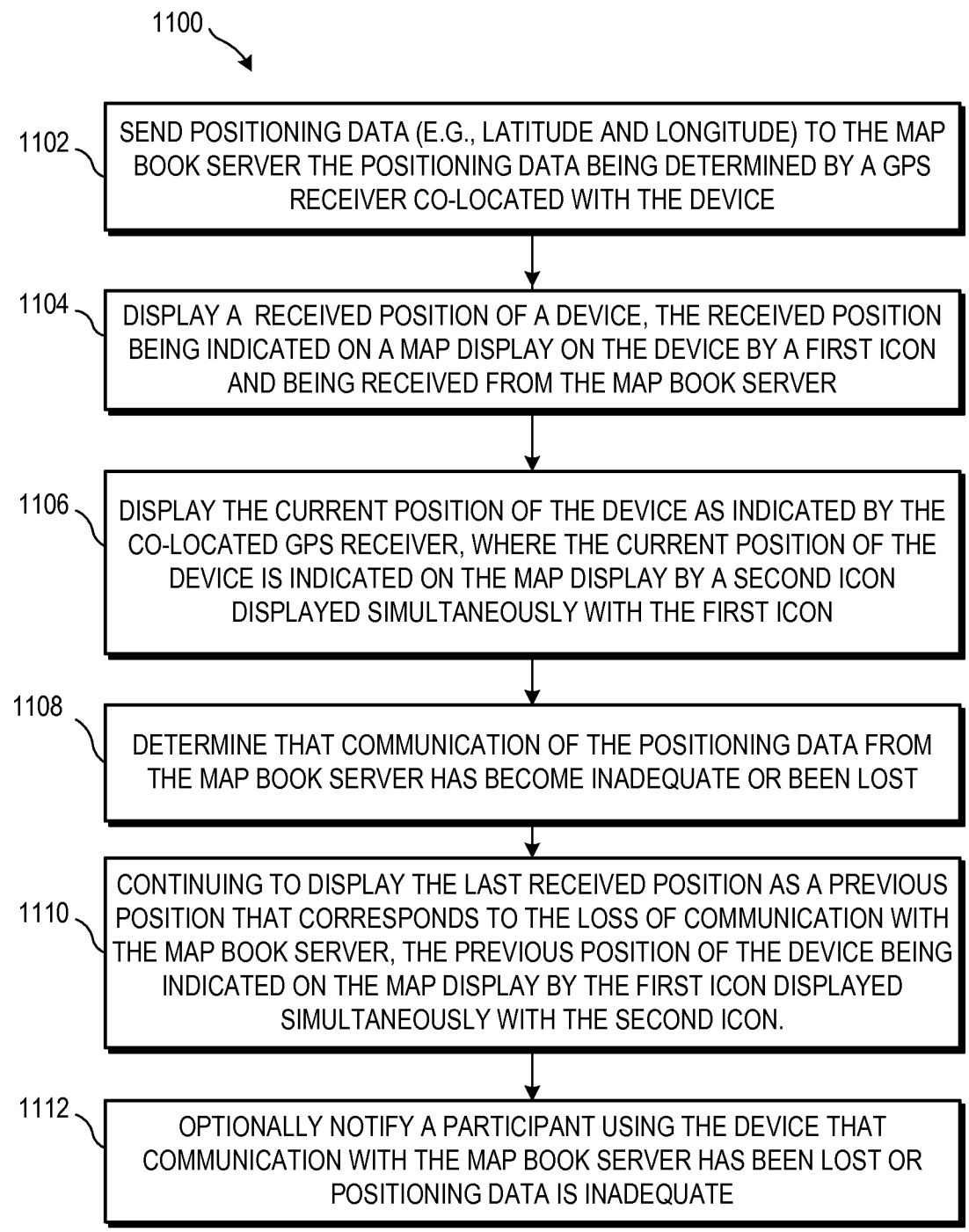
FIG. 11 is a flowchart illustrating a process for simultaneously displaying at least two geographic locations for a single device in accordance with various embodiments.

Referring now to FIG. 11, a flowchart illustrating a process 1100 for simultaneously displaying at least two geographic locations for a single device is provided. One or more devices, such as the one or more computing devices and/or servers of FIG. 1, can be configured to perform one or more steps of the process 1100. In some embodiments, the one or more devices performing the steps of the process 1100 are associated with a business, partner, third party, and/or user.

As illustrated at block 1102, a participant device at some regular interval sends positioning data to the map book server. This positioning data is determined from a GPS receiver co-located with the participant device. At the same time the participant device receives its position from the map book server, and displays this received position at block 1104, the position being indicated on a map display by a first icon. The first icon, in some embodiments, comprises any object or graphic that identifies the single device, a user of the device, or a vehicle associated with the device. For example, the first icon may be a badge with or without an outline and a number designator as discussed and/or shown elsewhere herein. The participant device also simultaneously displays the current position of the device as indicated by the co-located GPS receiver. This current position is indicated on the map display by a second icon displayed simultaneously with the first icon. In some embodiments, this second icon can be a blue or yellow dot. When the positioning data is accurate and indicates a more precise current position of the single device, a blue dot may be used. The blue dot can further indicate that the location of the single device is being reported to a mapping system at regular intervals. When the positioning data is not accurate enough to be used and/or is not being reported, a yellow dot may be shown to a user of the single device.

In further embodiments, the positioning receiver comprises a GPS receiver. In still further embodiments, the current position corresponds to the real-time position of the device. For example, the current position may correspond to a position that is updated at a regular interval such as every 1 to 60 seconds. In still further embodiments, the second icon is displayed when the map display is at or above a certain zoom level. For example, the second icon may only be displayed when a user of the device zooms in close on the map display. In other examples, the second icon is always displayed regardless of the zoom level of the map display. In some embodiments, at a zoom level where the second icon is not normally displayed at a particular zoom level, it can be displayed if and when there is a system problem. For example, a blue dot can appear with a badge when communication with the map book system server is lost even though it would not normally be displayed at that zoom level. The dot can be displayed as a yellow dot if GPS accuracy falls too low to be practical or usable by the system. Such may occur when not enough satellites are being received, or when the signal strength of one or more satellites falls too low.

As illustrated at block 1102, positioning data is sent to an on-line, real-time mapping system from the positioning receiver co-located with the device. Exemplary positioning data include geographical coordinates, addresses, identification of an intersection, road names, landmarks, highway mile markers, and the like. In some embodiments, the single device comprises the positioning receiver. For example, a GPS receiver may be incorporated into the device as hardware and/or software. In other embodiments, the positioning receiver is external to the single device. For example, a GPS receiver may be associated with a GPS device that is separate from the single device such as a mobile tracking unit carried by a user of the device. In some embodiments, the mapping system comprises the map book system server 130 or the third party system 140 of FIG. 1. In some embodiments, the sent positioning data is stored at the mapping system.

As illustrated at block 1106, an icon representing the current position of the device according to the local GPS receiver is displayed simultaneously with the first icon. In some embodiments, the dual display feature is displayed when the map display is at or above a certain zoom level. In the dual display feature, when the user is zoomed into the map past a certain level, the received position indicator based on what is sent by the mapping system and the current position indicator are placed on the map display by the Web browser platform of the single device. Again, that current position indicated by the second icon is not generated by the mapping system, but is generated by the device platform's GPS system. As such, the user sees a display where his or her position can be shown as being in two places at once. The update rate from the GPS receiver can be more frequent than the update rate from the Web based mapping system. In some cases, there may be a small delay as the device platform reports its position to the server and then the server (on the next polling cycle) updates that position. For example, the platform of the device polls the server every 3 to 10 seconds. By the time the updated position is received, the user may have moved. When zoomed out a great deal such that a large area of the map is shown, the small change in the user's position is not significant.

Figure 12:
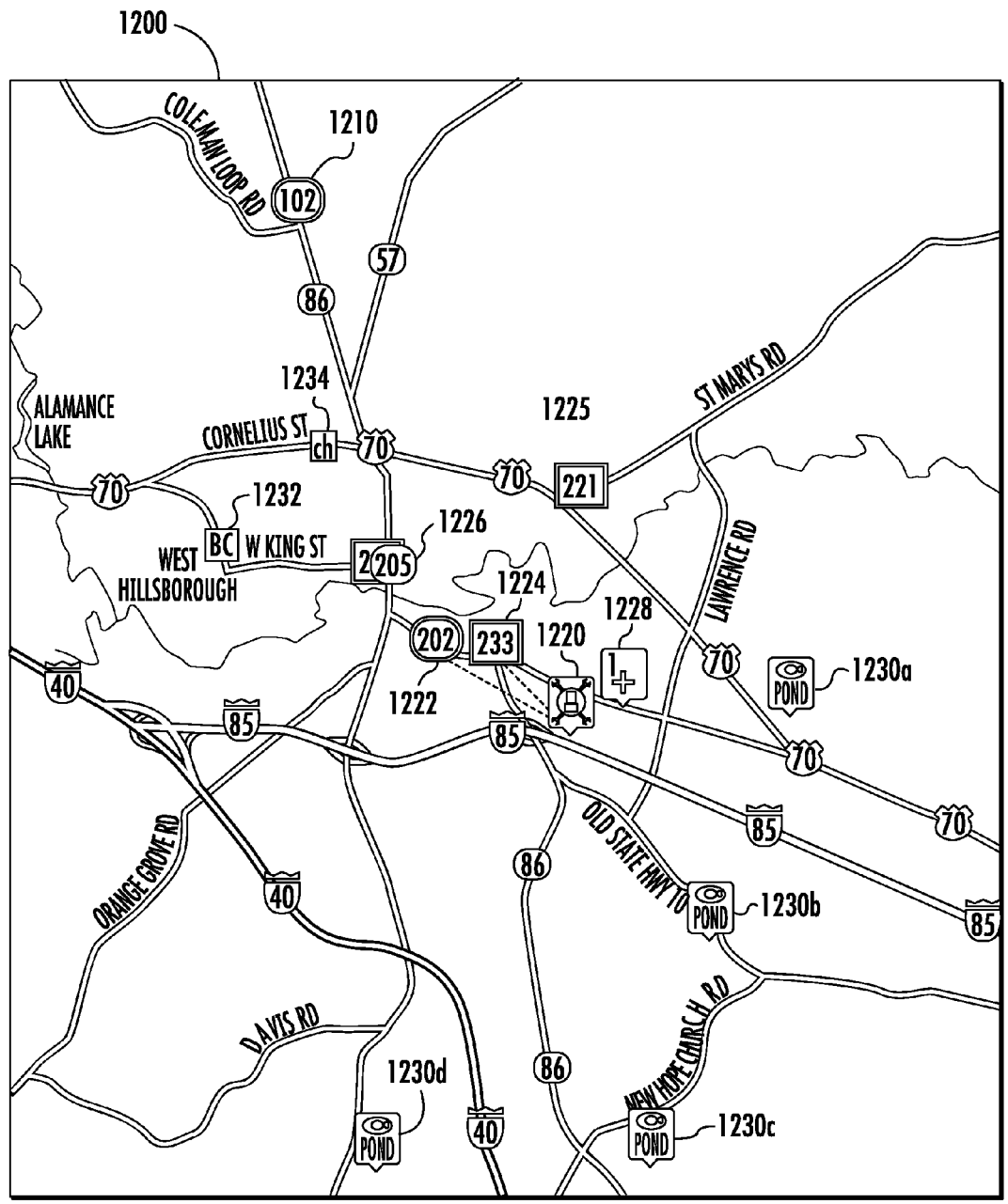
FIG. 12 illustrates a GUI of a map display in accordance with various embodiments.

In additional embodiments, the first indicator comprises any object or graphic that identifies the single device, a user of the device, or a vehicle associated with the device. Exemplary icons include participant or user identifiers, vehicle identifiers, symbols, shapes, color codes, and the like. In FIG. 12, for example, the users or vehicles associated with the device are displayed as numerical icons on a map display. In some embodiments, the user associated with the single device comprises event participants and/or participant vehicles. For example, the user may include emergency responders, non-emergency responders, survey participants, or any other entity involved in a particular event or operation.

As illustrated at block 1108, a determination is made that reception of positioning data from the on-line, real-time mapping system has been lost. In one example, the single device may have stopped communicating with the on-line, real-time mapping system. The single device, in some embodiments, stops communicating with the mapping system when a data signal is lost. For example, in remote or rural locations where coverage of the public wireless data network is spotty, emergency responders may lose the connection to the servers that run the map book system. In some embodiments, map data is stored in the single device. In such cases, the single device is still capable of providing the map display despite having dropped off the network. The device provides the map display to the user and receives positioning data from the GPS receiver such that the current position of the device is continuously updated. In other embodiments, a positioning system (e.g., GPS) has become inaccurate due to poor signaling. In such cases, the positioning data is not accurate enough to be used.

As illustrated at block 1110, the display of the position received from the map book server is continued as a previous position that corresponds to the loss of reception of the positioning data at the mapping system, the previous position of the device being indicated on the map display by the first icon displayed simultaneously with the second icon. In some embodiments, the previous position comprises the last known position of the single device. For example the last known position of the device may correspond to the last latitude and longitude received from the map book server or it may include updates received from the user of the device via radio transmissions or other alternative forms of communications. In situations in which communication with the mapping system has stopped, not only is an indication of the loss of connection provided, but an indication of what other event participants, supervisors, or map display viewers who are still in communication with the mapping system are likely to observe as the single device's current location is also provided. This display compensates for the delay through the server and allows the user to navigate to a destination when the cellular data connection is interrupted. In one example, the system displays the location and status of all the people responding to an event as that information comes from the server. All the people can see everyone else responding to an event, what their current status is (In Route, On Scene, Attached but Off Scene) and where they are. The icons used for people come from the central server for the system. As such, everyone has the same view of the event or incident.

As illustrated at block 1112, a user of the device is notified when the reception of the positioning data from the mapping system has been lost. In some embodiments, the notification includes a notification that the positioning signal has become inadequate to allow position determination, as in this case, accurate positioning data may not be sent to the map book system server to subsequently be sent from the map book system server to the device as a received position. For example, the signal from one or more of the GPS satellites may have become too weak to allow a GPS receiver to generate positioning data. In other embodiments, the notification includes a notification that communication between the device and the mapping system has been lost. For example, if the single device loses cell service, the time between communications between the single device and the mapping system can increase. If there is more than one minute without any communication, for example, the user of the device is notified. The notification can be generated by the single device as a pop-display, text, audible signal, vibrations, and the like. In other examples, the notification may also be in the form of a radio transmission. For example, the mapping system may prompt a person using the mapping system to notify the user of the single device that communication has been lost.

FIG. 12 illustrates a GUI 1200 of a map display that is "zoomed out." The map display, in the illustrated embodiment, shows various icons. Icons 1210, 1222, 1224, and 1225 are associated with resources such as participants or apparatuses that are responding to an incident and that are capable of being mobile. The numbers in icons 1210, 1222, 1224, and 1225 indicate the identity of the units associated with the icons. Icons containing symbols or graphics such as 1220, 1228, and 1230*a-d* denote stationary items such as a fixed resource or an incident. Icons 1232 and 1234 that include letters of the alphabet are associated with certain types of personnel.

In some embodiments, the various icons are color coded. Icons with a red background denote incidents; yellow backgrounds denote that a mobile resource is in route; black backgrounds denote that a mobile resource is available; green backgrounds denote that a mobile resource is on scene; white backgrounds denote that a mobile resource is attached to an incident, but not on scene (e.g., an ambulance going from the scene of the incident to the hospital); orange backgrounds denote that a mobile resource is not available because it is currently attached to another call; and gray backgrounds indicate that a mobile resource is out of service. In other embodiments, the borders of the icons denote various types of resources. For example, a black border around an icon indicates that the mobile resource associated with the icon includes an officer. In some cases, an oval or rounded icon indicates that the mobile resource associated with the icon includes a chief officer. A red border around an icon indicates that the mobile resource associated with the icon includes an apparatus such as a vehicle. When there is no border around the icon, the icon indicates that the resource associated with the icon is personnel. Upper case letters in the icon such as the icon 1232 indicate that the resource is fully certified. Lower case letters in the icon such as the icon 1234 indicate that the resource is not fully certified.

In FIG. 12, the icon 1220 has a red background and shows the location of an incident, in this case an automatic fire alarm. The icons 1222 and 1224 associated with units 202 and 233, respectively, have yellow backgrounds and denote units that are in route to that call. Icons 1222 and 1224 can have an optional line showing which incident they are in route to. The icon 1226 has a black background and denotes a unit that is available and not associated with any call. The icon 1225 has a white background and indicates that the mobile resource associated with the icon is off scene. The 1228 icon denotes an emergency medical service station and has a blue background and a Red Cross symbol. Water sources in the form of ponds that are close to the incident location are also displayed as icons 1230*a*-1230*d*. The symbols associated with the stationary icons can include any type of symbol. For example, fire stations may be indicated by blue icons having white fire fighter helmet symbols and fire hydrants may be indicated by blue icons having hydrant graphics.

Figure 13:
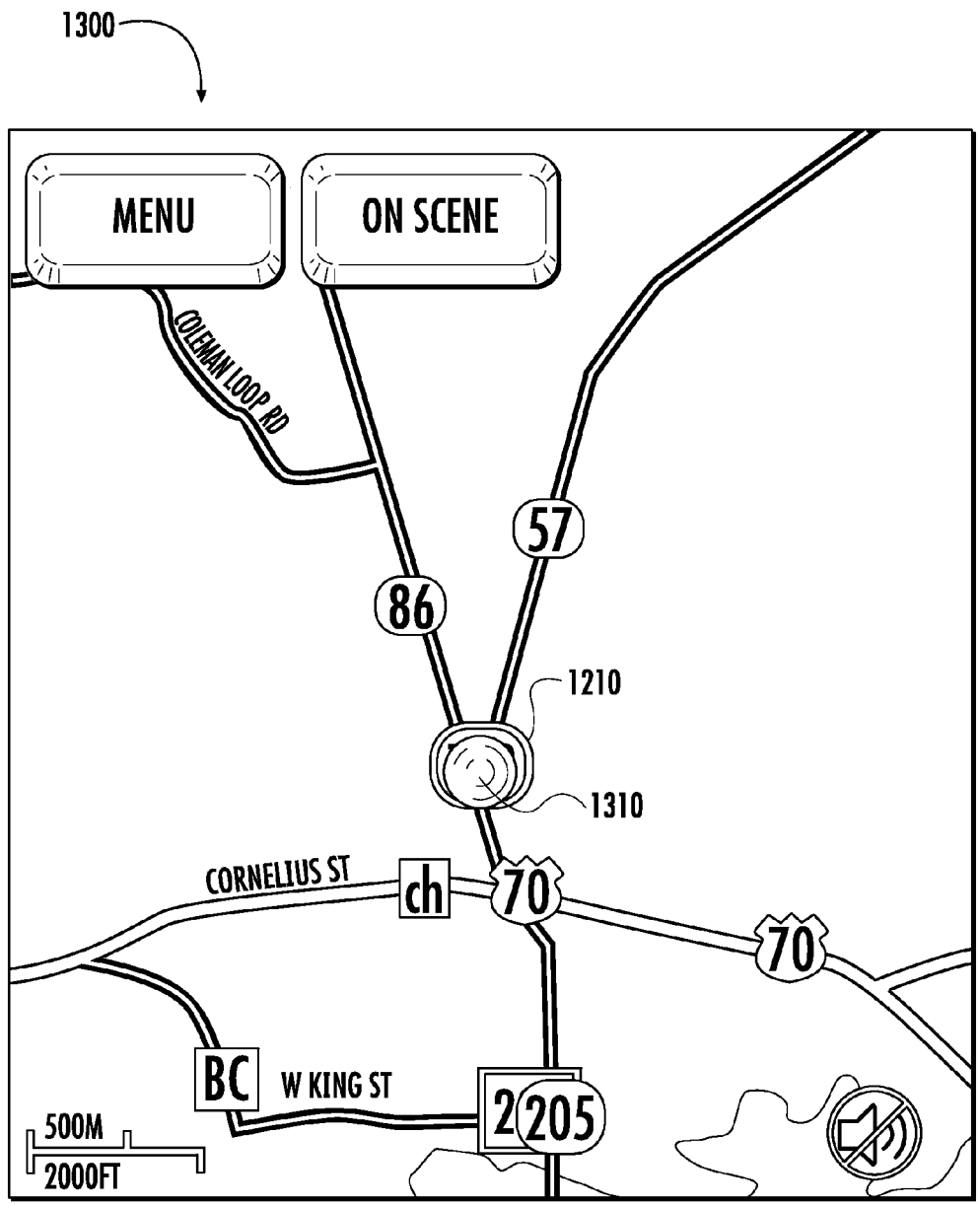
FIG. 13 illustrates a GUI of a zoomed in map display in accordance with various embodiments.
Figure 14:
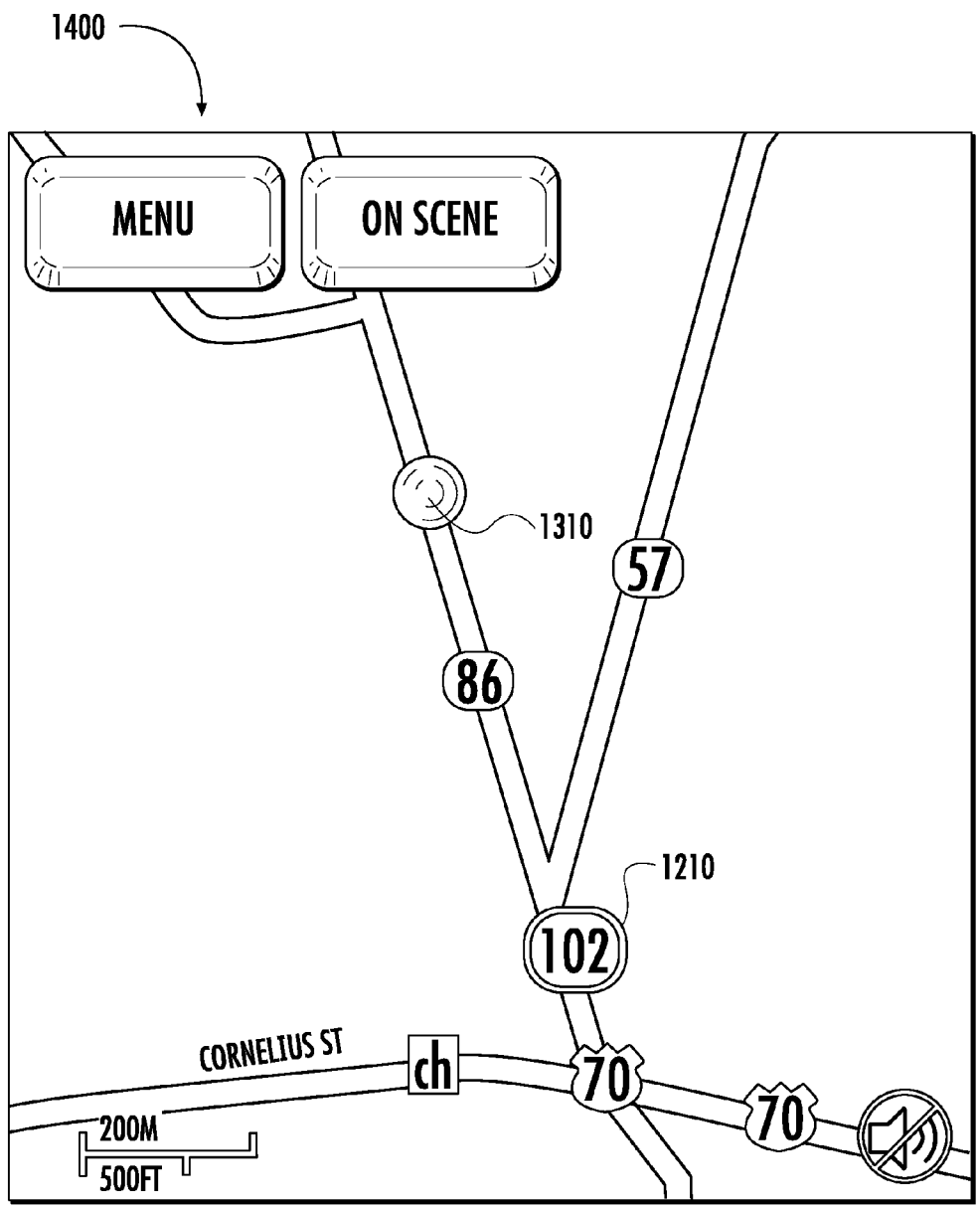
FIG. 14 illustrates a GUI of a zoomed in map display in accordance with various embodiments.

Further provided in FIG. 12 is the icon 1210 that indicates the last known position of the single device as saved in the mapping system for the unit with number 102. As shown in FIGS. 13-14, at high zoom levels, the map shows a very detailed view and may cover less than 1500 feet of area such that the error in the system position icon 1210 is more noticeable. FIG. 13 illustrates a GUI 1300 of the map display of the icon 1210 of FIG. 12 "zoomed in." Further illustrated is an icon 1310, which indicates the actual or current position of the device. The locally generated position icon 1310 (the blue marble) is, in some embodiments, only displayed when the user is at or above a certain zoom level. When the device is stationary, or when the system position of the device is the same as the actual position of the device, for example, the icon 1310 is positioned over the icon 1210 as shown in FIG. 13. In other examples, the actual position of icon 1310 may be under or adjacent to the icon 1210. In still other examples, the icon 1310 and 1210 may be offset from each other or slightly overlapping. Icon 1310, the blue marble, shows the current location of the user. Icon 1210 shows what the map page server has most recently sent as the location of the user. Due to polling delays in the system or due to drop outs in the communications link, the icons may be on top of each other as in FIG. 13 or separated by a distance as shown in FIG. 14.

FIG. 14 illustrates a GUI 1400 of the map display comprising both the actual icon 1310 of FIG. 13 and also the system position icon 1210 of FIG. 12 at a higher "zoom" level. In GUI 1400, the actual position of the device and the system position of the device are different. For example, the device may be moving such that the icon 1310 also moves while the icon 1210 remains stationary because communication with the system has stopped or due to delays due to the periodic polling of the users device to the map page server. As shown in FIG. 14, the icon 1310 and the icon 1210 are separate from each other.

By displaying the real time position in addition to the system position, the user can navigate down to the street level with ease. For example, as the user comes up on a cross street, he or she will know that "the next right" is where they want to turn. The user can see his position on the map and know where to turn even when the user temporarily loses cell based digital communications or when the polling delay creates an apparent error in the position display of the user. Further, if they lose communication with the mapping system, the maps stored on the mobile device will be sufficient to get them to the end destination without the device's platform having to refresh the screen via a cell tower and a Web page. In some embodiments, the software on the user's browser will notify the user if there have been no communications for some period of time, such as a minute.

In example embodiments, the icon follows the rules for all other icons on the system, and as such may have a zoom level to indicate at what level of map display zoom the icon shows up and/or a Z-Index to determine who wins when icons are overlapping on the screen, or which icon is displayed when two icons attempt to occupy the same spot on the screen.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of displaying an indication of quality of a geographic survey, the method comprising:
   displaying a survey grid corresponding to the geographic boundaries of a dynamically created survey area, wherein the displayed survey grid expands based on the geographic movement of survey participants;
   storing data representing the survey grid, cells of the survey grid, and a plurality of sub-cells into which each cell of the survey grid is divided;
   determining, using a processing device and ongoing positioning information for each participant engaged in the survey relative to each sub-cell within the cells, a numerical index corresponding to the quality of the survey in each cell of the survey grid; and
   adjusting, using the processing device, a display attribute associated with each cell of the survey grid in accordance with the numerical index.

2. The method of claim 1, wherein the numerical index is based on the number of times any participant has entered a cell of the survey grid or each sub-cell within a cell.

3. The method of claim 2, wherein the participant is not counted as having entered a cell until the participant is a pre-selected distance inside the perimeter of the cell.

4. The method of claim 2, wherein the numerical index is based on the number of times any unique participant has entered a cell or each sub-cell within a cell.

5. The method of claim 1, wherein the numerical index is based on the number of sub-cells within a cell that have been occupied by at least one participant.

6. The method of claim 1, wherein the display attribute is the opacity of a cell as seen overlain on a digitally displayed map of the designated survey area.

7. The method of claim 1, wherein the adjusting, using the processing device, a display attribute associated with each cell comprises:
adjusting, using the processing device, the opacity of a cell based on the percent of sub-cells within the cell that have been occupied by at least one participant.

8. The method of claim 1, wherein the dynamically created survey area is restricted to pre-set overall fixed geographic area.

9. The method of claim 1, wherein the ongoing positioning information comprises a latitude and a longitude.

10. The method of claim 1, wherein each cell has a square shape.

11. The method of claim 1, further comprising:
determining, using the processing device, that at least one participant is positioned a pre-selected distance outside of any of the cells; and
creating, using the processing device, a new cell in response to determining the position of the at least one participant.

12. A a non-transitory computer readable medium storing instructions that, when executed by a processor, allow the processor to perform a method of displaying an indication of quality of a geographic survey, the method comprising:
displaying a survey grid corresponding to the geographic boundaries of a dynamically created survey area, wherein the displayed survey grid expands based on the geographic movement of survey participants;
storing data representing the survey grid, cells of the survey grid, and a plurality of sub-cells into which each cell of the survey grid is divided;
determining using ongoing positioning information for each participant engaged in the survey relative to each sub-cell within the cells, a numerical index corresponding to the quality of the survey in each cell of the survey grid; and
adjusting a display attribute associated with each cell of the survey grid in accordance with the numerical index.

13. The non-transitory computer readable medium of claim 12, wherein the numerical index is based on the number of times any participant has entered a cell of the survey grid or each sub-cell within a cell.

14. The non-transitory computer readable medium of claim 13, wherein the participant is not counted as having entered a cell until the participant is a pre-selected distance inside the outer perimeter of the cell.

15. The non-transitory computer readable medium of claim 13, wherein the numerical index is based on the number of times any unique participant has entered a cell or each sub-cell within a cell.

16. The non-transitory computer readable medium of claim 12, wherein the numerical index is based on the number of sub-cells within a cell that have been occupied by at least one participant.

17. The non-transitory computer readable medium of claim 12, wherein the display attribute is the opacity of a cell as seen overlain on a digitally displayed map of the designated survey area.

18. A system for displaying an indication of quality of a geographic survey, the system comprising:
a data store comprising data representing the survey grid, cells of the survey grid, and a plurality of sub-cells into which each cell of the survey grid is divided; and
an instruction execution platform including non-transitory computer program code, which when executed, causes the instruction execution platform to:
display a survey grid corresponding to the geographic boundaries of a dynamically created survey area, wherein the displayed survey grid expands based on the geographic movement of survey participants;
determine, using ongoing positioning information for each participant engaged in the survey relative to each sub-cell within the cells, a numerical index corresponding to the quality of the survey in each cell of the survey grid; and
adjust a display attribute associated with each cell of the survey grid in accordance with the numerical index.

19. The system of claim 18, wherein the numerical index is based on the number of times any participant has entered a cell of the survey grid or each sub-cell within a cell.

20. The system of claim 18, wherein the numerical index is based on the number of sub-cells within a cell that have been occupied by at least one participant.

21. The system of claim 18, wherein the display attribute is the opacity of a cell as seen overlain on a digitally displayed map of the designated survey area.

22. Apparatus for displaying an indication of quality of a geographic survey, the apparatus comprising:
means for displaying a survey grid corresponding to the geographic boundaries of a dynamically created survey area, wherein the displayed survey grid expands based on the geographic movement of survey participants;
means for storing data representing the survey grid, cells of the survey grid, and a plurality of sub-cells into which each cell of the survey grid is divided;
means for determining, using ongoing positioning information for each participant engaged in the survey relative to each sub-cell within the cells, a numerical index corresponding to the quality of the survey in each cell of the survey grid; and
means for adjusting, using a processor, a display attribute associated with each cell of the survey grid in accordance with the numerical index.

23. The apparatus of claim 22, wherein the numerical index is based on the number of times any participant has entered a cell of the survey grid or each sub-cell within a cell.

24. The apparatus of claim 22, wherein the numerical index is based on the number of sub-cells within a cell that have been occupied by at least one participant.

25. The apparatus of claim 22, wherein the display attribute is the opacity of a cell as seen overlain on a digitally displayed map of the designated survey area.

* * * * *